United States Patent
Jones et al.

(10) Patent No.: US 11,680,199 B2
(45) Date of Patent: Jun. 20, 2023

(54) WELLBORE SERVICING FLUID AND METHODS OF MAKING AND USING SAME

(71) Applicant: Halliburton Energy Services, Inc., Houston, TX (US)

(72) Inventors: Paul J. Jones, Houston, TX (US); Samuel J. Lewis, Houston, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/587,612

(22) Filed: Jan. 28, 2022

(65) Prior Publication Data

US 2022/0363972 A1    Nov. 17, 2022

Related U.S. Application Data

(60) Provisional application No. 63/188,700, filed on May 14, 2021.

(51) Int. Cl.
*C09K 8/467* (2006.01)
*C04B 40/00* (2006.01)
(Continued)

(52) U.S. Cl.
CPC .............. *C09K 8/467* (2013.01); *C04B 14/06* (2013.01); *C04B 22/066* (2013.01);
(Continued)

(58) Field of Classification Search
CPC ....... C09K 8/467; C04B 14/06; C04B 22/066; C04B 24/023; C04B 24/38; C04B 28/02;
(Continued)

(56) References Cited

U.S. PATENT DOCUMENTS 6,451,743 B1    9/2002   Fox
6,620,769 B1    9/2003   Juppe et al.
(Continued)

FOREIGN PATENT DOCUMENTS

EP    0104795 A2    4/1984
EP    1348832 A1    10/2003
(Continued)

OTHER PUBLICATIONS

Foreign Communication from Related Application—International Search Report and Written Opinion of the International Searching Authority, International Application No. PCT/US2022/015171, dated May 24, 2022, 10 pages.

(Continued)

*Primary Examiner* — Crystal J. Lee
(74) *Attorney, Agent, or Firm* — Conley Rose, P.C.; Rodney B. Carroll

(57) ABSTRACT

A liquid additive composition comprising a particulate material, an organic carrier fluid, a viscosifier, and an alcohol alkoxylate surfactant; wherein the particulate material is substantially insoluble in the organic carrier fluid; wherein the particulate material comprises a water-interactive material and/or a water-insoluble material; wherein the organic carrier fluid comprises a glycol and/or a glycol ether; and wherein the viscosifier comprises amorphous silica. A method comprising (a) contacting a particulate material, an organic carrier fluid, a viscosifier, and an alcohol alkoxylate surfactant to form a mixture; and (b) agitating the mixture to form the liquid additive composition.

20 Claims, 6 Drawing Sheets

(51) Int. Cl.
*C04B 14/06* (2006.01)
*C04B 22/06* (2006.01)
*C04B 24/02* (2006.01)
*C04B 28/02* (2006.01)
*E21B 33/14* (2006.01)
*C04B 24/38* (2006.01)
*C04B 103/40* (2006.01)

(52) U.S. Cl.
CPC ............ *C04B 24/023* (2013.01); *C04B 24/38* (2013.01); *C04B 28/02* (2013.01); *C04B 40/0039* (2013.01); *E21B 33/14* (2013.01); *C04B 2103/406* (2013.01)

(58) Field of Classification Search
CPC ........... C04B 40/0039; C04B 2103/406; E21B 33/14
See application file for complete search history.

(56) References Cited

U.S. PATENT DOCUMENTS

| | | | |
|---|---|---|---|
| 6,668,929 | B2 | 12/2003 | Griffith et al. |
| 6,743,756 | B2 | 6/2004 | Harris, Jr. |
| 7,740,070 | B2 | 6/2010 | Santra et al. |
| 7,790,774 | B1 | 9/2010 | Kinsey, III et al. |
| 9,120,918 | B2 | 9/2015 | Soddemann et al. |
| 2003/0181532 | A1 | 9/2003 | Parris et al. |
| 2008/0017376 | A1 | 1/2008 | Badalamenti et al. |
| 2012/0152540 | A1 | 6/2012 | Patil et al. |
| 2014/0090843 | A1 | 4/2014 | Boul et al. |
| 2014/0166285 | A1 | 6/2014 | Santra et al. |
| 2014/0318786 | A1 | 10/2014 | Vidma et al. |
| 2014/0326452 | A1 | 11/2014 | Loiseau et al. |
| 2015/0072902 | A1 | 3/2015 | Lafitte et al. |
| 2016/0160109 | A1 | 6/2016 | Patil et al. |
| 2016/0264838 | A1 | 9/2016 | Nelson |
| 2016/0264842 | A1 | 9/2016 | Miller et al. |
| 2017/0130115 | A1* | 5/2017 | Ballard ................. C09K 8/428 |
| 2021/0355366 | A1 | 11/2021 | Jadhav et al. |

FOREIGN PATENT DOCUMENTS

| | | | | |
|---|---|---|---|---|
| EP | 3814448 | A1 | 5/2021 | |
| WO | 2007074330 | A1 | 7/2007 | |
| WO | 2007132212 | A2 | 11/2007 | |
| WO | 2014167375 | A1 | 10/2014 | |
| WO | WO-2014167375 | A1 * | 10/2014 | ............... C09K 8/06 |
| WO | 2016154363 | A1 | 9/2016 | |
| WO | 2020209831 | A1 | 10/2020 | |
| WO | WO-2020209831 | A1 * | 10/2020 | ......... C04B 22/0093 |
| WO | 2021230954 | A1 | 11/2021 | |
| WO | 2022240458 | A1 | 11/2022 | |

OTHER PUBLICATIONS

Office Action dated Jun. 13, 2022 (22 pages), U.S. Appl. No. 17/188,524, filed Mar. 1, 2021.
Foreign Communication from Related Application—International Search Report and Written Opinion of the International Searching Authority, International Application No. PCT/US2021/020507, dated Jun. 21, 2021, 11 pages.
Electronic Acknowledgement Receipt, Specification and Drawings for International Application No. PCT/US2021/0020507, entitled "A Wellbore Servicing Fluid and Methods of Making and Using Same," filed Mar. 2, 2021, 70 pages.
Filing Receipt, Specification and Drawings for U.S. Appl. No. 63/025,702, entitled "Wellbore Servicing Fluid and Methods of Making and Using Same," filed May 15, 2020, 53 pages.
Thwala, Justice M. et al., "Rheological Studies of Stability of Colloidal Silica Particles Dispersed in Monoethylene Glycol (MEG) Stabilized by Dodecyl Hexa Ethylene Glycol Monoether (C12E6)," Langmuir, Jul. 23, 2009, vol. 25, No. 22, pp. 12926-12936, American Chemical Society.
Electronic Acknowledgment Receipt, Specification and Drawings for International Application No. PCT/US2022/15171, entitled "A Wellbore Servicing Fluid and Methods of Making and Using Same," filed Feb. 4, 2022, 55 pages.
Office Action dated Jan. 21, 2022 (21 pages), U.S. Appl. No. 17/188,524, filed Mar. 1, 2021.
Filing Receipt, Specification and Drawings for U.S. Appl. No. 17/188,524 entitled "Wellbore Servicing Fluid and Methods of Making and Using Same," filed Mar. 1, 2021, 84 pages.
Filing Receipt, Specification and Drawings for U.S. Appl. No. 63/188,700, entitled "Wellbore Servicing Fluid and Methods of Making and Using Same," filed May 14, 2021, 63 pages.
Foreign Communication from Related Application—International Search Report and Written Opinion of the International Searching Authority, International Application No. PCT/US2019/026362, dated Jan. 6, 2020, 11 pages.

* cited by examiner

SAMPLE I

SAMPLE II

SAMPLE III

SAMPLE VI

WELLBORE SERVICING FLUID AND METHODS OF MAKING AND USING SAME

CROSS REFERENCE TO RELATED APPLICATIONS

This application claims priority to U.S. Provisional Application No. 63/188,700 filed May 14, 2021 and entitled "A Wellbore Servicing Fluid and Methods of Making and Using Same," which is incorporated by reference herein in its entirety.

BACKGROUND

This disclosure relates to compositions and methods of servicing a wellbore. More specifically, it relates to wellbore servicing fluid compositions and methods of using same during servicing a wellbore penetrating a subterranean formation.

Natural resources such as gas, oil, and water residing in a subterranean formation or zone are usually recovered by drilling a wellbore down to the subterranean formation while circulating a drilling fluid in the wellbore. The drilling fluid is usually circulated downward through an interior of a drill pipe and upward through an annulus, which is located between the exterior of the drill pipe and the interior wall of the wellbore. After terminating the circulation of the drilling fluid, a string of pipe, e.g., casing, is run in the wellbore. Next, a train of fluids, including a spacer or an efficiency fluid, can be placed though the interior of the pipe and upward into the annulus to displace a portion of the existing fluid in the annulus, in order to separate the drilling fluid from the cementing fluid and prepare the wellbore to receive the cementing fluid. After that, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

Offshore oil and gas production is usually more challenging than land-based onshore oil and gas production due to remote and harsher environment. Offshore drilling, completion, workover, and production operations are typically conducted from a drilling rig located on an offshore platform that is bottom-founded or floating. A bottom-founded platform extends from the seafloor upwardly to a deck located above the surface of the water, and at least a portion of the weight of the platform is supported by the seafloor. A floating platform is a ship, vessel, or another structure such as a tension-leg platform, in which the weight of the platform is supported by water buoyancy. Both of the two types of the offshore platforms may have constraints for equipment/tools due to offshore conditions (e.g., limited space, motion) and may need special equipment/tools, compared to an onshore wellbore. In addition, offshore drilling, completion, workover, and production operations present more environmental challenges than those operations onshore, from the produced hydrocarbons and the materials used during the operations.

Generally, magnesium oxide (MgO) can be added to a cement slurry to achieve post set expansion of the cement after placement in a well. MgO is conventionally added as a powder to the cement dry powder blend in the bulk plant and transported to location. For land cementing operations, the cement dry powder blend may be created for a specific job containing dry additives at the required concentrations. On location, the cement dry powder blend and mix water can be combined in the recirculating cement mixer or batch mixer before going down hole. However, in offshore cementing operations limitations in the offshore rig's silo storage capacity limits the number of dry cement blends to be sent to the rig, and liquid additives are added to the mix water either through a chemical mixing system (CMS) or by batch mixing. When MgO is used in an offshore application, it is usually added as a dry powder to the entire dry blend sent offshore. This leads to excess material in the cement dry powder blend that may or may not be necessary for all of operations that will be carried out using the cement dry powder blend, leading to unnecessary complexity, increased material costs and reduced asset value.

Thus, an ongoing need exists for a wellbore servicing fluid and methods of making and using same at a location having limited equipment/tools/space (e.g., an offshore platform), while reducing environmental impacts.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
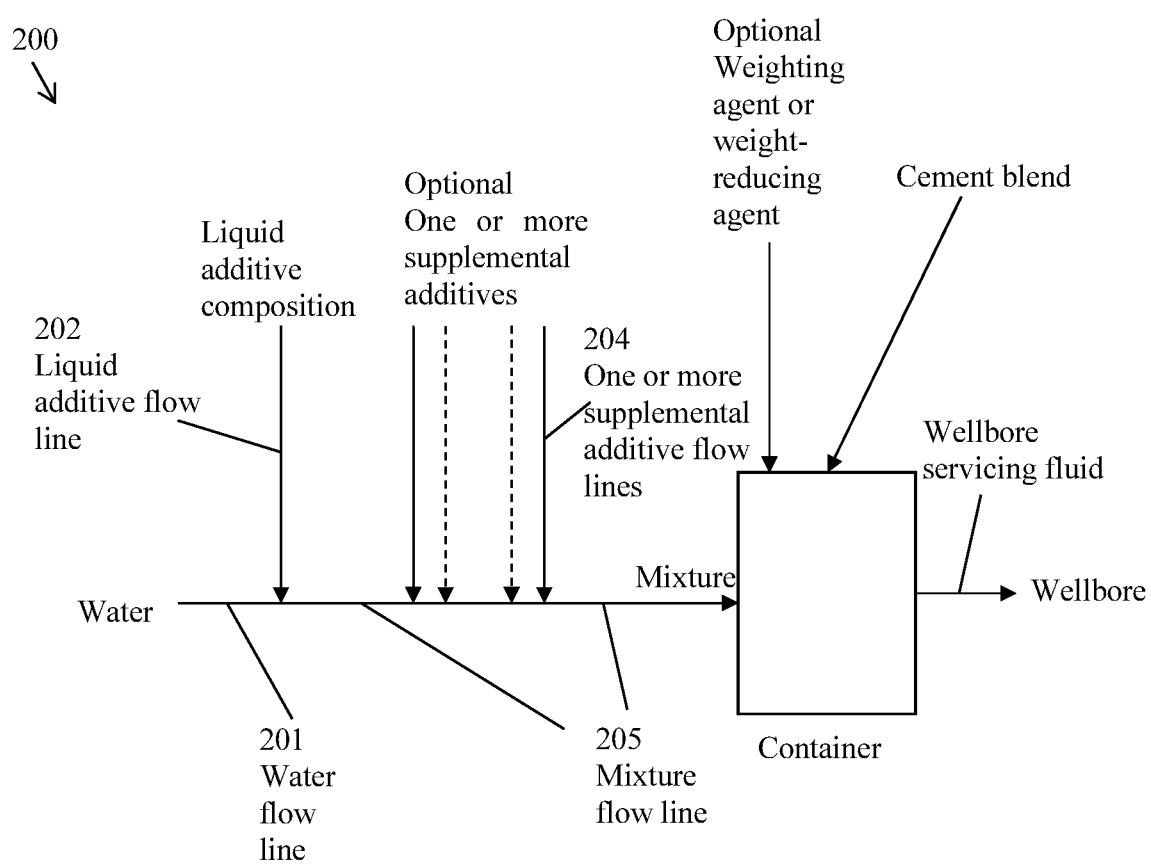
FIG. 1 is a process flow diagram according to some embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. It is to be understood that "subterranean formation" encompasses both areas below exposed earth and areas below earth covered by water such as ocean or fresh water.

Disclosed herein are liquid additive compositions for use in wellbore servicing operations. The liquid additive compositions as disclosed herein may comprise a particulate material, an organic carrier fluid, a viscosifier, and a surfactant (for example, an alcohol alkoxylate surfactant); wherein the particulate material is substantially insoluble in the organic carrier fluid; wherein the particulate material comprises a water-interactive material and/or a water-insoluble material; and wherein the organic carrier fluid comprises a glycol and/or a glycol ether. In an aspect, the viscosifer comprises diutan alone or in combination with amorphous silica.

Also disclosed herein are methods and compositions for making and using a wellbore servicing fluid, more specifically, a wellbore servicing fluid comprising the liquid additive composition. In embodiments, a wellbore servicing fluid of the type disclosed herein can be a cementitious fluid or cement slurry, and can be used for cementing a wellbore penetrating a subterranean formation.

Further disclosed herein are methods of preparing a liquid additive composition, methods of preparing a wellbore servicing fluid comprising the liquid additive composition, and methods of servicing a wellbore (e.g., cementing) by placing the wellbore servicing fluid comprising the liquid additive composition into the wellbore.

In embodiments, the wellbore servicing fluid can be a cementitious fluid, wherein the cementitious fluid comprises the liquid additive composition, water, and a cement blend.

In embodiments, the liquid additive composition can comprise a particulate material, an organic carrier fluid, a viscosifier, and a surfactant (for example, an alcohol alkoxylate surfactant). In embodiments, the liquid additive composition is a substantially homogenous mixture (e.g., a suspension) in which the particulate material does not dissolve, but gets uniformly suspended throughout the bulk of an organic carrier fluid. For example, the particulate material is uniformly dispersed (e.g., floating around freely) in the liquid additive composition. A discontinuous internal phase (e.g., particulate material) of the liquid additive composition be uniformly dispersed throughout a continuous external phase (e.g., organic carrier fluid) of the homogenous liquid additive composition through preparation (e.g., mixing or blending), with the use of a viscosifying suspending agent (e.g., a viscosifiers, such as diutan alone or in combination with amorphous silica). The liquid additive composition may be prepared by mixing or blending the components of the liquid additive composition to form the homogenous suspension. When used in conjunction with a cementitious wellbore servicing fluid, the liquid additive composition can function to mitigate cement shrinkage (e.g., prevent or decrease the extent of cement shrinkage).

The particulate material is substantially insoluble in the organic carrier fluid. In embodiments, the particulate material can be characterized by a solubility in the organic carrier fluid of less than about 100 mmol/L, alternatively less than about 50 mmol/L, alternatively less than about 25 mmol/L, alternatively less than about 10 mmol/L, alternatively less than about 1 mmol/L, alternatively less than about 0.1 mmol/L, alternatively less than about 0.01 mmol/L, or alternatively less than about 0.001 mmol/L. The particulate material may comprise a water-interactive material and/or a water-insoluble material. While the current disclosure is discussed in detail in the context of the liquid additive composition comprising a water-interactive material and/or a water-insoluble material, it should be understood that any material that is substantially insoluble in the organic carrier fluid may be used as the particulate material in the liquid additive composition.

In embodiments, the particulate material may comprise a water-interactive material. While the water-interactive material is substantially insoluble in the organic carrier fluid, the water-interactive material may react with water and/or be water soluble. For example, the water-interactive material can be substantially insoluble in the organic carrier fluid (e.g., characterized by a solubility in the organic carrier fluid of less than about 10 mmol/L) and can be soluble in water (e.g., characterized by a solubility in water of equal to or greater than about 10 mmol/L, alternatively equal to or greater than about 100 mmol/L, or alternatively equal to or greater than about 1 mol/L). As another example, the water-interactive material can be substantially insoluble in the organic carrier fluid (e.g., characterized by a solubility in the organic carrier fluid of less than about 10 mmol/L) and can interact with water, whereby the water-interactive material is consumed once in contact with water (e.g., by dissolution in water; by reacting with water and/or aqueous solution components). Liquid additive compositions as disclosed herein comprising a particulate material comprising a water-interactive material enable suspending the water-interactive material in aqueous-compatible suspensions, when the formation of water suspensions is not feasible owing to the intrinsic material properties of the particulate material with respect to water. For example, attempting to form aqueous suspensions of water-interactive materials can significantly and undesirably increase the viscosity of the aqueous suspension, thereby undesirably limiting the aqueous suspensions to relatively low concentrations of water-interactive material.

In embodiments, the water-interactive material may comprise an expansion agent, a viscosifying clay, a delayed viscosifier, a fluid loss agent, and the like, or combinations thereof.

The expansion agents may comprise inorganic oxides, alkali metal oxides, alkaline earth metal oxides, metal powders, inorganic silicates, and the like, or combinations thereof. For example, the expansion agents may comprise magnesium oxide, non-calcined magnesium oxide, calcined magnesium oxide, lightly burned magnesium oxide, hard burned magnesium oxide, dead burned magnesium oxide, calcium oxide, aluminum powder, a gypsum blend (e.g., a calcium aluminate/calcium sulfate blend), magnesium iron silicate, olivine, aluminum powder, magnesium powder, iron powder, zinc powder, and the like, or combinations thereof. Expansion agents can provide for a bulk volumetric increase of a composition, for example a cementitious composition comprising an expansion agent may exhibit a bulk volumetric increase upon setting. For example, an expansion agent may be any material that enables a gas to become incorporated into the cement composition. As another example, an expansion agent may be any material or materials that reacts with water to yield a product with a volume greater than the individual reactants. As yet another example, an expansion agent comprising a gypsum blend is commercially available as MICROBOND™ expanding additive from Halliburton Energy Services, Inc. In addition, examples of expansion agents comprising dead burned magnesium oxide are commercially available as MICROBOND™ M expanding additive and MICROBOND™ HT expanding additive from Halliburton Energy Services, Inc.

In embodiments, the particulate material comprises inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, and the like, or combinations thereof.

In embodiments, the particulate material comprises an expansion agent such as magnesium oxide (MgO), non-calcined magnesium oxide, calcined magnesium oxide, lightly burned magnesium oxide, hard burned magnesium oxide, dead burned magnesium oxide, and the like, or combinations thereof. MgO may be substituted in the liquid additive compositions as disclosed herein by other expansion agents that may yield lower density, higher volume species upon hydration in an aqueous medium; nonlimiting examples of which include inorganic oxides (e.g., calcium oxide). In some embodiments, the particulate material comprises magnesium oxide. In other embodiments, the particulate material comprises calcium oxide. In yet other embodiments, the particulate material comprises both calcium oxide and magnesium oxide.

In still yet other embodiments, the MgO may be substituted in the liquid additive compositions as disclosed herein by latent expansive compounds, including compounds of a mineral nature, that may give rise to lower density, higher volume products upon hydration; nonlimiting examples of which include inorganic silicates, such as magnesium iron silicate (e.g., olivine).

In still yet other embodiments, the MgO may be substituted in the liquid additive compositions as disclosed herein by reactive species that evolve gases upon reaction with an alkali medium and thereby contribute to volumetric expansion in cement slurry or other fluid; nonlimiting examples of which include inorganic metal powders such as powders of aluminum, magnesium, iron, zinc, and the like, or combinations thereof.

In still yet other embodiments, the MgO may be substituted in the liquid additive compositions as disclosed herein by an ettringite precursor, ettringite, calcium aluminum sulfate, hydrous calcium aluminum sulfate, a calcium aluminate mixture, a calcium aluminate cement (CAC) and calcium sulfate mixture, a gypsum blend (e.g., a calcium aluminate/calcium sulfate blend), and the like, or combinations thereof.

The viscosifying clay and the delayed viscosifier are viscosifiers for aqueous solutions, but do not substantially increase the viscosity of the liquid additive composition. The liquid additive composition acts as a carrier for the particulate material comprising the viscosifying clay and/or the delayed viscosifier, such that the viscosifying clay and/or the delayed viscosifier may increase the viscosity of a wellbore servicing fluid, such as a cementitious fluid. The viscosifying clay may comprise bentonite, sepiolite, hectorite, and the like, or combinations thereof. The delayed viscosifier may comprise crosslinked materials, such as crosslinked guar, crosslinked vinyl alcohols, crosslinked acrylamide polymers, and the like, or combinations thereof.

The fluid loss agent may comprise an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethylacrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N—N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof, and the like, or combinations thereof. Generally, a fluid loss agent may control the loss of fluid to a wellbore and/or subterranean formation.

In embodiments, the particulate material may comprise a water-insoluble material; such as pozzolana cement, sand, a weighting agent (e.g., an iron oxide, such as hematite; a manganese oxide, such as hausmannite; a titanium-iron oxide, such as ilmenite, etc.), a fiber (e.g., carbon fiber, acrylonitrile fiber, polypropylene fiber, rubber fiber, glass fiber, etc.), a rubber particle; a hollow glass sphere; a hollow pozzolanic sphere; a glass bubble; a glass ball; a ceramic ball; graphite; pozzolan; pumice; trass; clay; calcined clay; silica, fume silica, amorphous silica, micro-sized silica, nano-sized silica; and the like; or combinations thereof A weighting agent can increase a density of a fluid. Fibers suitable for use as particulate material in the present disclosure can be further characterized by any suitable aspect ratio. The aspect ratio of a fiber may be calculated by dividing the length of the fiber by the diameter of the fiber. For example, fibers suitable for use as a particulate material as disclosed herein may be characterized by an aspect ratio of equal to or greater than about 2:1, alternatively equal to or greater than about 5:1, or alternatively equal to or greater than about 10:1.

In embodiments where the particulate material comprises a water-insoluble material, the liquid additive composition as disclosed herein does not require the use of a biocide (although a biocide may be used), while an aqueous suspension comprising the water-insoluble material would necessitate the use of a biocide to mitigate shelf life issues due to degradation of the aqueous suspension over time. Organic carrier fluids as disclosed herein may be biocidic when largely water-free.

In embodiments, the particulate material can be characterized by a particle size of from about 1 nm to about 10,000 μm, alternatively from about 10 nm to about 9,000 μm, alternatively from about 10 nm to about 1,000 μm, alternatively from about 0.1 μm to about 7,500 μm, alternatively from about 0.5 μm to about 5,000 μm, alternatively from about 0.1 μm to about 1,000 μm, alternatively from about 0.1 μm to about 500 μm, alternatively from about 0.1 μm to about 250 μm, alternatively from about 1 μm to about 100 μm, alternatively from about 2 μm to about 50 μm, or alternatively from about 10 μm to about 25 μm. For purposes of the disclosure herein, the particle size refers to the largest dimension of any two-dimensional cross section through the particle. Nonlimiting examples of particulate material shapes suitable for use in the present disclosure include cylindrical, discoidal, spherical, tabular, ellipsoidal, equant, irregular, cubic, acicular, angular, and the like, or combinations thereof.

In embodiments, the particulate material can be characterized by a particle size of from about 0.1 μm to about 250 μm, alternatively from about 1 μm to about 100 μm, alternatively from about 2 μm to about 50 μm, or alternatively from about 10 μm to about 25 μm. In some embodiments, the particulate material is characterized by an angular and/or acicular shape. In other embodiments, the particulate material is characterized by a spherical shape. In yet other embodiments, the particulate material is characterized by a spherical shape, angular shape, acicular shape, or combinations thereof. For example, the particulate material may comprise any suitable combination of spherical shape particles, angular shape particles, acicular shape particles, and the like.

In embodiments, a particulate material suitable for use in the present disclosure may have a particle size in the range of from about 60 to about 1,250 mesh, alternatively from about 80 to about 625 mesh, or alternatively from about 140 to about 400 mesh, U.S. Sieve Series.

In some embodiments, a particulate material suitable for use in the present disclosure may have a particle size of about 325 mesh, U.S. Sieve Series. The particulate material may be characterized by having substantially all of the particles pass through a 325 mesh screen, U.S. Sieve Series. The particulate material may be characterized by having a majority (e.g., greater than about 50 wt. %, alternatively greater than about 75 wt. %, alternatively greater than about 90 wt. %, alternatively greater than about 95 wt. %, or alternatively greater than about 99 wt. %, based on a total weight of the particulate material) of the particles pass through a 325 mesh screen, U.S. Sieve Series; although some particles (e.g., less than about 50 wt. %, alternatively less than about 25 wt. %, alternatively less than about 10 wt. %, alternatively less than about 5 wt. %, or alternatively less than about 1 wt. %, based on a total weight of the particulate material) may not pass through the 325 mesh screen, U.S. Sieve Series.

In embodiments, the particulate material can comprise magnesium oxide characterized by a particle size in a range of from about 2 µm to about 60 µm, in a range of from about 5 µm to about 45 µm, or alternatively in a range of from about 10 µm to about 25 µm. In such embodiments, the particulate material may be characterized by an angular shape. The magnesium oxide may be a burnt type of magnesium oxide, such as lightly burned magnesium oxide, hard burned magnesium oxide, dead burned magnesium oxide, and the like, or combinations thereof.

In embodiments, the particulate material can be present in the liquid additive composition in an amount of from about 1 wt. % to about 80 wt. %, alternatively from about 1 wt. % to about 70 wt. %, alternatively from about 1 wt. % to about 60 wt. %, alternatively from about 1 wt. % to about 50 wt. %, alternatively from about 5 wt. % to about 40 wt. %, alternatively from about 10 wt. % to about 30 wt. %, alternatively from about 10 wt. % to about 80 wt. %, alternatively from about 20 wt. % to about 70 wt. %, alternatively from about 30 wt. % to about 60 wt. %, or alternatively from about 40 wt. % to about 55 wt. %, based on a total weight of the liquid additive composition.

In some embodiments, the particulate material can comprise magnesium oxide, wherein the magnesium oxide can be present in the liquid additive composition in an amount of from about 40 wt. % to about 75 wt. %, alternatively from about 40 wt. % to about 74.5 wt. %, alternatively from about 40 wt. % to about 70 wt. %, alternatively from about 40 wt. % to about 60 wt. %, or alternatively from about 45 wt. % to about 55 wt. %, based on a total weight of the liquid additive composition.

The organic carrier fluid may comprise a glycol and/or a glycol ether. Glycols suitable for use in the present disclosure may comprise an alkylene glycol, monoethylene glycol (MEG, also known as ethylene glycol), propylene glycol, butylene glycol, polyalkylene glycol, polyethylene glycol, polypropylene glycol, polybutylene glycol, and the like, or combinations thereof. Generally, when substantially water-free, glycols may be biocidic, and consequently the use of a biocide in the liquid additive composition may be unnecessary. Glycol ethers suitable for use in the present disclosure may comprise methyl ethers and/or ethyl ethers of the glycols that are suitable for use as organic carrier fluid as disclosed herein. For example, glycol ethers suitable for use in the present disclosure may comprise ethylene glycol monomethyl ether, ethylene glycol monoethyl ether, propylene glycol monomethyl ether, propylene glycol monoethyl ether, butylene glycol monomethyl ether, butylene glycol monoethyl ether, and the like, or combinations thereof. The glycol and/or a glycol ether that are suitable for use as organic carrier fluid in the suspension compositions as disclosed herein may degrade within a few weeks upon contacting seawater.

The organic carrier fluid may be substantially water-free. However, the organic carrier fluid may contain trace amounts of water (e.g., from manufacturing process, atmospheric moisture, etc.). For example, the organic carrier fluid may contain less than about 1 wt. %, alternatively less than about 0.1 wt. %, alternatively less than about 0.01 wt. %, alternatively less than about 0.001 wt. %, or alternatively less than about 0.0001 wt. % water, based on a total weight of the organic carrier fluid. The lack of elevated water content in the organic carrier fluid may prevent hydration (e.g., significant hydration) of the particulate material (e.g., magnesium oxide).

The organic carrier fluid is water miscible. As opposed to an oil (e.g., oleaginous fluid), the organic carrier fluids as disclosed herein are water miscible, such that a compatibilizer-type material (e.g., a surfactant other than the alcohol alkoxylate surfactant of the liquid additive composition) is not necessary in order to be able to homogenously mix the liquid additive composition with an aqueous fluid (e.g., an aqueous wellbore servicing fluid). Further, in certain applications, an oleaginous fluid may be undesirable.

In embodiments, the organic carrier fluid comprises MEG. MEG, also referred to as ethylene glycol, is an organic compound characterized by the formula $(CH_2OH)_2$. Pure MEG is an odorless and colorless liquid at room temperature and is miscible in water. MEG biodegrades relatively quickly in soil (e.g., half-life of about 2-12 days), surface water (e.g., half-life of about 2-12 days), and ground water (e.g., half-lite of about 4-24 days). MEG can be used as an organic carrier fluid in the liquid additive composition and can degrade within a few weeks upon contacting seawater.

In embodiments, the organic carrier fluid can be present in the liquid additive composition in an amount of from about 20 wt. % to about 90 wt. %, alternatively, from about 20 wt. % to about 89.8 wt. %, alternatively from about 25 wt. % to about 80 wt. %, alternatively from about 25 wt. % to about 70 wt. %, alternatively from about 25 wt. % to about 60 wt. %, alternatively from about 30 wt. % to about 60 wt. %, alternatively from about 40 wt. % to about 60 wt. %, or alternatively from about 45 wt. % to about 55 wt. %, based on a total weight of the liquid additive composition.

In some embodiments, MEG can be present in the liquid additive composition in an amount of from about 40 wt. % to about 60 wt. %, or alternatively from about 42.5 wt. % to about 57.5 wt. %, or alternatively from about 45 wt. % to about 55 wt. %, based on a total weight of the liquid additive composition.

The liquid additive composition may comprise a viscosifier. In embodiments, the viscosifier functions as a suspending agent in the liquid additive composition. The viscosifier herein can also be referred to as a viscosifying suspending agent. Without being limited by theory, the viscosifier can prevent the particulate material (e.g., magnesium oxide) from settling in the liquid additive composition after preparation. In embodiments, the viscosifer comprises a biopolymer. In embodiments, the viscosifier comprises diutan. In embodiments, the viscosifier comprises amorphous silica. In embodiments, the viscosifier comprises diutan alone or in combination with amorphous silica. Nonlimiting examples of amorphous silica suitable for use as a viscosifier in the present disclosure include non-mined amorphous silica, precipitated silica, fumed silica, silica fume, porous silica, micro-sized silica, nano-sized silica, and the like, or combinations thereof. In an embodiment, the viscosifer comprises diutan and precipitated silica.

In embodiments, the viscosifier can comprise a biopolymer gum, guar gum, xanthan gum, welan gum, diutan, cellulose, hydroxyethyl cellulose (HEC), modified cellulose, diatomaceous earth, starch, modified/crosslinked starch, viscoelastic surfactants (VES), derivatives thereof, and the like, or combinations thereof.

The viscosifier can be present in the liquid additive composition in an amount of from about 0.01 wt. % to about 10 wt. %, alternatively from about 0.05 wt. % to about 9 wt. %, alternatively from about 0.1 wt. % to about 8 wt. %, alternatively from about 0.15 wt. % to about 7 wt. %, alternatively from about 0.25 wt. % to about 5 wt. %, alternatively from about 0.5 wt. % to about 4 wt. %, alternatively from about 1 wt. % to about 4 wt. %, or alternatively from about 2 wt. % to about 3 wt. %, based on a total weight of the liquid additive composition.

In some embodiments, diutan can be present in the liquid additive composition in an amount of from about 0 wt. % to about 0.1 wt. %, alternatively from about 0.001 wt. % to about 0.075 wt. %, or alternatively from about 0.01 wt. % to about 0.05 wt. %, based on a total weight of the liquid additive composition.

In some embodiments, amorphous silica can be present in the liquid additive composition in an amount of from about 0.25 wt. % to about 5 wt. %, alternatively from about 0.5 wt. % to about 4 wt. %, alternatively from about 1 wt. % to about 4 wt. %, or alternatively from about 2 wt. % to about 3 wt. %, based on a total weight of the liquid additive composition.

In embodiments, the liquid additive composition may comprise amorphous silica (e.g., precipitated silica) in an amount of from about 1 wt. % to about 4 wt. % and diutan in an amount of from about 0.01 wt. % to about 0.05 wt. %, based on a total weight of the liquid additive composition.

The liquid additive composition may comprise a surfactant. The liquid additive composition may comprise an alcohol alkoxylate surfactant. For example, the liquid additive composition may comprise an alcohol ethoxylate surfactant. The surfactant (e.g., alcohol alkoxylate surfactant) may help reduce or prevent gelling of the liquid additive composition prior to using the liquid additive composition (e.g., prior to adding the liquid additive composition into a wellbore servicing fluid).

The alcohol alkoxylate surfactant may be characterized by the general formula $R^1(OR^2)_nOH$; wherein n (degree of ethoxylation) is from about 1 to about 30, alternatively from about 3 to about 25, or alternatively from about 3 to about 10. $R^1$ is an alkyl group, which may be either a linear alkyl group (i.e., $R^1$ is characterized by a degree of branching of equal to 0) or a branched alkyl group (i.e., $R^1$ is characterized by a degree of branching of greater than 0). In embodiments where $R^1$ is a branched alkyl group, $R^1$ can be characterized by a degree of branching of greater than 0, alternatively from about 1 to about 5, or alternatively from about 1 to about 4. For example, an alkyl group having a degree of branching of 1 displays a single branching point. $R^1$ can have from about 3 to about 25 carbon atoms, alternatively from about 5 to about 20 carbon atoms, or alternatively from about 8 to about 18 carbon atoms. $R^2$ is an alkylene group, which may be either linear or branched. In embodiments, $R^2$ can be ethylene, propylene, butylene, pentylene, and the like, or combinations thereof. $R^2$ can have from about 2 to about 5 carbon atoms, alternatively from about 2 to about 4 carbon atoms, or alternatively from about 2 to about 3 carbon atoms. In some embodiments, $R^2$ can be ethylene and/or propylene.

In embodiments, the alcohol alkoxylate surfactant may comprise an alcohol ethoxylate surfactant characterized by the general formula $R^1(OCH_2CH_2)_nOH$ having a degree of ethoxylation (n) of about 5, an $R^1$ carbon chain length of about 10, and a single branch point (i.e., a degree of branching of 1). A nonlimiting example of an alcohol ethoxylate surfactant includes Lutensol® XP50, which is a nonionic surfactant commercially available from BASF.

The liquid additive may comprise a fatty alcohol ethoxylate surfactant. Examples of suitable fatty alcohol ethoxylate surfactants include lauryl alcohol ethoxylate, behenyl alcohol ethoxylate, stearyl alcohol ethoxylate, and combinations thereof.

The surfactant (e.g., alcohol alkoxylate surfactant) can be present in the liquid additive composition in an amount of from about 0.1 wt. % to about 10 wt. %, alternatively from about 0.15 wt. % to about 5 wt. %, alternatively from about 0.25 wt. % to about 4 wt. %, alternatively from about 0.4 wt. % to about 2.5 wt. %, or alternatively from about 0.5 wt. % to about 1 wt. %, based on a total weight of the liquid additive composition.

In some embodiments, the alcohol alkoxylate surfactant (e.g., alcohol ethoxylate surfactant) can be present in the liquid additive composition in an amount of from about 0.25 wt. % to about 4 wt. %, alternatively from about 0.4 wt. % to about 2.5 wt. %, or alternatively from about 0.5 wt. % to about 1 wt. %, based on a total weight of the liquid additive composition.

In embodiments, the liquid additive composition can comprise a particulate material (e.g., magnesium oxide (MgO)), an organic carrier fluid (e.g., monoethylene glycol (MEG)), a viscosifier (e.g., diutan and/or amorphous silica, such as precipitated silica), and an alcohol ethoxylate surfactant characterized by the general formula $R^1(OCH_2CH_2)_nOH$. In some embodiments, the liquid additive composition can comprise a particulate material (e.g., MgO), an organic carrier fluid (e.g., MEG), precipitated silica, diutan, and an alcohol ethoxylate surfactant characterized by the general formula $R^1(OCH_2CH_2)_nOH$; wherein n is about 5, wherein $R^1$ is an alkyl group having about 10 carbon atoms, and wherein $R^1$ is characterized by a degree of branching of about 1. In such embodiments, the MgO may comprise non-calcined magnesium oxide, calcined magnesium oxide, lightly burned magnesium oxide, hard burned magnesium oxide, dead burned magnesium oxide, and the like, or combinations thereof.

In embodiments, the liquid additive composition substantially homogenous mixture (e.g., a suspension) in which the particulate material (e.g., MgO) does not dissolve, but gets uniformly suspended throughout the bulk of the organic carrier fluid (e.g., MEG). For example, the particulate material (e.g., MgO) can be uniformly dispersed (e.g., floating around freely) in the liquid additive composition. A discontinuous internal phase (e.g., particulate material such as MgO) of the liquid additive composition can be uniformly dispersed throughout a continuous organic carrier fluid (e.g., MEG) external phase of the homogenous liquid additive composition through preparation (e.g., mixing or blending), with the use of a viscosifying suspending agent (e.g., the viscosifier), such as amorphous silica (e.g., precipitated silica) and optionally diutan; in the presence of a surfactant, such as an alcohol alkoxylate surfactant as disclosed herein.

In some embodiments, the liquid additive composition may comprise (i) from about 40 wt. % to about 74.5 wt. % particulate material (e.g., magnesium oxide, non-calcined magnesium oxide, calcined magnesium oxide, lightly burned magnesium oxide, hard burned magnesium oxide, dead burned magnesium oxide, and the like, or combinations thereof), (ii) from about 25 wt. % to about 60 wt. % ethylene glycol, (iii) from about 0.25 wt. % to about 5 wt. % amorphous silica (e.g., precipitated silica), (iv) from equal to or greater than about 0 wt. % to about 0.1 wt. % diutan, and (v) from about 0.25 wt. % to about 4 wt. % alcohol ethoxylate surfactant; based on a total weight of the liquid additive composition; wherein the alcohol ethoxylate surfactant is characterized by the general formula $R^1(OCH_2CH_2)_nOH$; wherein n is about 5, wherein $R^1$ is an alkyl group having about 10 carbon atoms, and wherein $R^1$ is characterized by a degree of branching of about 1.

In embodiments, the liquid additive composition can be characterized by a plastic viscosity (e.g., initial plastic viscosity and/or aged plastic viscosity) of from about 200 cP to about 2,500 cP, alternatively from about 300 cP to about 2,400 cP, alternatively from about 400 cP to about 2,200 cP, alternatively from about 500 cP to about 2,000 cP, or alternatively from about 600 cP to about 1,750 cP. The initial plastic viscosity and the aged plastic viscosity are measured under the same conditions at the time of preparing the composition and at a time later than the time of preparing the composition, respectively. The aged plastic viscosity may be measured after preparation at 1 day, 2 days, 3 days, 4 days, 5 days, 6 days, 7 days, 10 days, 14 days, 21 days, 28 days, etc. The initial plastic viscosity and the aged plastic viscosity may be calculated using a Herschel-Bulkley model.

In embodiments, the liquid additive composition can be characterized by a yield point (e.g., initial yield point and/or aged yield point) of from about 1 $lb_f/100$ $ft^2$ to about 30 $lb_f/100$ $ft^2$, alternatively from about 2.5 $lb_f/100$ $ft^2$ to about 27.5 $lb_f/100$ $ft^2$, alternatively from about 5 $lb_f/100$ $ft^2$ to about 25 $lb_f/100$ $ft^2$, or alternatively from about 10 $lb_f/100$ $ft^2$ to about 20 $lb_f/100$ $ft^2$. The initial yield point and the aged yield point are measured under the same conditions at the time of preparing the composition and at a time later than the time of preparing the composition, respectively. The aged yield point may be measured after preparation at 1 day, 2 days, 3 days, 4 days, 5 days, 6 days, 7 days, 10 days, 14 days, 21 days, 28 days, etc. The initial yield point and the aged yield point may be calculated using a Herschel-Bulkley model.

In embodiments, the liquid additive composition as disclosed herein has a specific gravity of from about 1.0 to about 2.5, alternatively from about 1.2 to about 2.0, alternatively from about 1.5 to about 1.9, alternatively from about 1.55 to about 1.8, or alternatively from about 1.60 to about 1.75.

In embodiments, the liquid additive composition as disclosed herein has a flash point of equal to or greater than about 100° C., alternatively equal to or greater than about 110° C., or alternatively equal to or greater than about 125° C.

In embodiments, the liquid additive composition as disclosed herein has a melting point of less than about −10° C., alternatively less than about −15° C., or alternatively less than about −25° C.

In embodiments, the liquid additive composition as disclosed herein has a boiling point of equal to or greater than about 190° C., alternatively equal to or greater than about 200° C., or alternatively equal to or greater than about 210° C.

In embodiments, the liquid additive composition stays substantially homogeneous and in a pourable fluid form during a storage period after being prepared. During the storage period, the liquid additive composition may display a minimal amount of free fluid, such as less than about 25 vol. %, alt less than about 20 vol. % alternatively less than about 15 vol. %, alternatively less than about 10 vol. %, or alternatively less than about 5 vol. %, based on a total volume of the liquid additive composition. The storage period can be equal to or greater than about 1 day, alternatively equal to or greater than about 7 days, alternatively equal to or greater than about 14 days, alternatively equal to or greater than about 21 days, or alternatively equal to or greater than about 28 days.

In embodiments, a liquid additive composition of the type disclosed herein can be prepared using any suitable method. For example, a method of the present disclosure can comprise contacting components of the liquid additive composition (e.g., a particulate material, such as an expansion agent (MgO); an organic carrier fluid, such as MEG; an alcohol alkoxylate surfactant, such as an alcohol ethoxylate surfactant; a viscosifier, such as amorphous silica (e.g., precipitated silica); and optionally an additional viscosifier such as diutan) to form the liquid additive composition. The contacting can comprise placing the components into a suitable liquid additive container (e.g., a mixer, a blender, a sonicator, a bid mill, a homogenizer) to form a suspension mixture, and blending the suspension mixture until the suspension mixture becomes a pumpable fluid (e.g., a liquid additive composition). The liquid additive container can be any container that is compatible with the suspension mixture and has sufficient space for the suspension mixture. A blender can be used for blending.

In embodiments, a method of making the liquid additive composition as disclosed herein may comprise (a) contacting a particulate material, an organic carrier fluid, a viscosifier, and an alcohol alkoxylate surfactant to form a suspension mixture; and (b) agitating (e.g., shearing, stirring, shaking, blending, mixing, gas bubbling, pumping, and the like, or combinations thereof) the suspension mixture to form the liquid additive composition.

In embodiments, a liquid additive composition of the type disclosed herein can be prepared by contacting a viscosifier, such as amorphous silica (e.g., precipitated silica), and an organic carrier fluid. The contacting can comprise placing the components into a suitable liquid additive container (e.g., a mixer, a blender, a sonicator, a bid mill, a homogenizer) to form a base mixture. In some embodiments, the amorphous silica may be added to the organic carrier fluid, for example under agitation (e.g., shear), in order to form the base mixture. In other embodiments, the organic carrier fluid may be added to the amorphous silica, for example under agitation, in order to form the base mixture. In yet other embodiments, the amorphous silica and the organic carrier fluid may be added simultaneously to a mixing container, for example under agitation, in order to form the base mixture. The base mixture can then be contacted with the particulate material to be dispersed which is then mixed, as described herein, to form a uniform suspension comprising the particulate material. In embodiments where a viscosifier (e.g., additional viscosifier) other than amorphous silica is employed, the additional viscosifier may be contacted with and incorporated into the uniform suspension, for example under agitation. The uniform suspension may be contacted with the alcohol alkoxylate surfactant, such as an alcohol ethoxylate surfactant, to form a liquid additive composition.

In embodiments, a liquid additive composition of the type disclosed herein can be prepared by contacting amorphous silica (e.g., precipitated silica) and organic carrier fluid (e.g., MEG) to form a base mixture. The contacting can comprise (i) placing the organic carrier fluid into a suitable liquid additive container (e.g., a mixer, a blender, a sonicator, a bid mill, a homogenizer) and applying shear to the organic carrier fluid; (ii) mixing (e.g., blending, adding) the amorphous silica into the organic carrier fluid to form a base mixture; (iii) mixing the particulate material (e.g., an expansion agent, such as MgO) into the base mixture to form an uniform suspension; (iv) adding a viscosifier (e.g., diutan) other than amorphous silica to the uniform suspension and applying shear; and (v) adding the surfactant (e.g., alcohol alkoxylate surfactant, such as an alcohol ethoxylate surfactant), to the uniform suspension to form a liquid additive composition.

In some embodiments, the order of addition of viscosifier(s), particulate material, and surfactant (e.g., alcohol alkoxylate surfactant) to the organic carrier fluid may be adjusted as necessary or desired.

The liquid additive composition as disclosed herein can be used in any suitable fluid, such as a wellbore servicing fluid. In embodiments, the wellbore servicing fluid may comprise a cementitious fluid.

In embodiments, the liquid additive composition can be prepared at the wellsite. Components of the liquid additive composition can be transported to the wellsite and combined (e.g., mixed/blended) proximate the wellsite to form the liquid additive composition. The components of the liquid additive composition can be pre-combined such that the liquid additive composition is prepared at a location remote from the wellsite and transported to the wellsite, and, if necessary, stored at an on-site location for use in making a wellbore servicing fluid. When it is desirable to prepare the liquid additive composition at the wellsite, the components of the liquid additive composition can be added into a liquid additive container (e.g., a blender tub, for example mounted on a trailer), and the suspension mixture is then blended until the suspension mixture becomes a pumpable fluid (e.g., a liquid additive composition). In some other embodiments, the liquid additive composition is prepared at a location remote from the wellsite, transported to the wellsite, optionally stored at the wellsite and combined with water, and other necessary components (e.g., a cement blend), and optionally one or more additives (e.g., supplemental additives), such as weighting agents, or weight-reducing agents to form a wellbore servicing fluid. Transporting of the liquid additive composition and/or the components of the liquid additive composition can be done by a ship, a pipeline, tanker truck, or any suitable transportation method.

In embodiments, the liquid additive composition can be present in a wellbore servicing fluid in an amount ranging from about 0.1 wt. % to about 60 wt. %, alternatively from about 0.1 wt. % to about 40 wt. %, alternatively from about 0.1 wt. % to about 20 wt. %, alternatively from about 0.5 wt. % to about 10 wt. %, or alternatively from about 1 wt. % to about 5 wt. %, based on the total weight of the wellbore servicing fluid.

In embodiments, the wellbore servicing fluid (e.g., cementitious fluid) further comprises one or more additives (e.g., supplemental additives). The one or more supplemental additives may comprise a defoamer, a cement retarder, a cement dispersant, a fluid loss control additive, a fume silica, a free fluid control additive, a viscosifying agent, an acid, a base, an emulsifier, a salt, a corrosion inhibitor, a mutual solvent, a conventional breaking agent, a relative permeability modifier, lime, a gelling agent, a crosslinker, a flocculant, a water softener, a proppant, an oxidation inhibitor, a thinner, a scavenger, a gas scavenger, a lubricant, a friction reducer, a bridging agent, a vitrified shale, a thixotropic agent, a surfactant, a scale inhibitor, a clay, a clay control agent, a clay stabilizer, a silicate-control agent, a biostatic agent, a storage stabilizer, a filtration control additive, a foaming agent, a foam stabilizer, latex emulsions, a formation conditioning agent, elastomers, gas/fluid absorbing materials, a lost circulation material, resins, superabsorbers, mechanical property modifying additives, inert particulates, and the like, or combinations thereof.

A wellbore servicing fluid (e.g., cementitious fluid) of the type disclosed herein can exclude a biocide. In embodiments, a wellbore servicing fluid of the type disclosed comprises equal to or less than about 1%, 0.1%, 0.001%, 0.0001%, 0.00001%, 0.000001%, or 0.0000001% biocide, based on the total weight of the wellbore servicing fluid.

The wellbore servicing fluid (e.g., cementitious fluid) can be used in a wellbore having a Bottomhole Circulating Temperature (BHCT) from about 70° F. to about 400° F., alternatively from about 120° F. to about 400° F., or alternatively from about 160° F. to about 370° F. In embodiments, the wellbore servicing fluid is used in a wellbore having a Bottomhole Static Temperature (BHST) from about 100° F. to about 400° F., alternatively from about 150° F. to about 400° F., or alternatively from about 190° F. to about 400° F.

In some embodiments, the wellbore servicing fluid comprising the liquid additive composition may be a cementitious fluid. A cementitious fluid refers to the material used to permanently seal an annular space between a casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is less viscous and has less strength than cement or concrete used for construction, since the cementitious fluid is required to be pumpable in a relatively narrow annulus over long distances.

In embodiments, the wellbore servicing fluid (e.g., cementitious fluid) comprises a cement blend. The cement blend can comprise, consist essentially of, or consist of a cementitious material. In an aspect, the cement blend comprises, consists essentially of, or consists of a dry, homogenous cementitious material in powder form. The cementitious material can comprise, consist essentially of, or consist of Portland cement, pozzolana cement, gypsum cement, shale cement, acid cement, base cement, phosphate cement, high alumina content cement, slag cement, silica cement, high alkalinity cement, magnesia cement, lime, amorphous silica, siliceous material, fly ash, any cementitious material, and the like, or combinations thereof As used herein, the term "high alumina content cement" refers to a cement having an alumina concentration in the range of from about 40 wt. % to about 80 wt. %, by a weight of the high alumina content cement. The term "high alkalinity cement" refers to a cement having a sodium oxide concentration in the range of from about 1.0 wt. % to about 2.0 wt. %, by a weight of the high alkalinity cement.

In embodiments, the cementitious material is present in the cement blend in an amount of from about 1% BWOB (by weight of blend) to about 100% BWOB, alternatively from about 5% BWOB to about 100% BWOB, alternatively from about 10% BWOB to about 80% BWOB, or alternatively from about 20% BWOB to about 60% BWOB, based on a total weight of the cement blend. In an aspect, the cement blend consists of 100 BWOB of a single cementitious material in dry powder form.

In embodiments, the cement blend further comprises an expansion agent. Without limitation, examples of expansion agents suitable for use in the cement blend of the present disclosure include metal powders, aluminum powder, magnesium powder, iron powder, zinc powder, a gypsum blend, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, inorganic silicates, magnesium iron silicate, olivine, an ettringite precursor, ettringite, calcium aluminum sulfate, hydrous calcium aluminum sulfate, a calcium aluminate mixture, a calcium aluminate cement (CAC) and calcium sulfate mixture, a gypsum blend (e.g., a calcium aluminate/calcium sulfate blend), and the like, or combinations thereof.

In embodiments where both the particulate material and the cement blend comprise an expansion agent, the expansion agent of the particulate material and the expansion agent of the cement blend can be the same or different. For example, in some embodiments, both the particulate material and the cement blend can independently comprise lightly burned magnesium oxide. As another example, in some embodiments, the particulate material can comprise aluminum powder, while the cement blend can comprise lightly burned magnesium oxide.

In embodiments, the expansion agent can be present in the cement blend in an amount of from about 1% BWOB to about 10% BWOB, alternatively from about 1.5% BWOB to about 7.5% BWOB, or alternatively from about 2% BWOB to about 5% BWOB, based on a total weight of the cement blend.

In embodiments, the cement blend further comprises one or more cement blend additives. The one or more cement blend additives can comprise quartz flour, bulk flow enhancer, aggregate, particles, filler, amorphous silica, siliceous material, fly ash, and the like, or combinations thereof.

In embodiments, the one or more cement blend additives can be present in the cement blend in an amount of from about 5% BWOB to about 95% BWOB, alternatively from about 5% BWOB to about 80% BWOB, alternatively from about 10% BWOB to about 60% BWOB, or alternatively from about 15% BWOB to about 40% BWOB, based on a total weight of the cement blend.

A cement blend of the type disclosed herein can be prepared using any suitable method. Components of the cement blend can be predetermined. In embodiments, the cement blend comprises more than one component (e.g., a cementitious material, an expansion agent, a bulk flow enhancer, and one or more cement blend additives), which can be dry mixed to form the cement blend. The dry mixing can be at a location away from the wellsite and the cement blend can be transported to the wellsite. In embodiments, the components of the cement blend can be prepared at a location remote from the wellsite and transported to the wellsite, and, if necessary, stored at an on-site location. When desired, the components of the cement blend can be dry mixed at the wellsite. In embodiments, the cement blend contains (e.g., consists essentially of or consists of) one component (i.e., a cementitious material) and can be transported and stored at the wellsite. Transporting of the cement blend and/or the components of the cement blend can be by a ship or any suitable transportation. In embodiments, the components of the cement blend can be added to a dry-mixing container (e.g., a mixing head of a solid feeding system) and be dry mixed therein. The dry-mixing container can be any container that is compatible with the components of the cement blend and has sufficient space for the components of the cement blend. A blender can be used for dry mixing.

In embodiments, the cement blend can be present in the wellbore servicing fluid in an amount ranging from about 20 wt. % to about 90 wt. %, alternatively from about 40 wt. % to about 80 wt. %, or alternatively from about 60 wt. % to about 70 wt. %, based on the total weight of the wellbore servicing fluid.

The wellbore servicing fluid (e.g., cementitious fluid) can comprise water. The water can be selected from a group including freshwater, seawater, saltwater, brine (e.g., underground natural brine, formulated brine, etc.), and combinations thereof. Generally, the water may be from any source, provided that it does not contain an amount of components that may undesirably affect the other components in the wellbore servicing fluid. The water can be present in the wellbore servicing fluid in an amount effective to provide a slurry having desired (e.g., job or service specific) rheological properties. The water can be present in the wellbore servicing fluid in an amount of from about 10 L/100 kg to about 400 L/100 kg, alternatively from about 20 L/100 kg to about 150 L/100 kg, or alternatively from about 30 L/100 kg to about 65 L/100 kg, based on a total weight of the cement blend.

In embodiments, the wellbore servicing fluid (e.g., cementitious fluid) further comprises a weighting agent and/or a weight-reducing agent. In embodiments, a weighting agent and/or a weight-reducing agent may be included within the cement blend (e.g., as part of a dry cement blend or dry cementitious composition) prior to formation of a wellbore servicing fluid by mixing the cement blend with water to form a pumpable cement slurry. A weighting agent can increase a density of the wellbore servicing fluid. Nonlimiting examples of suitable weighting agents for the present disclosure include barium sulfate, (i.e., barite), iron oxide (i.e., hematite), manganese oxide (i.e., hausmannite), and combinations thereof. An example of weighting agent suitable for use in this disclosure includes without limitation a synthetic hausmannite known as MICROMAX® FF weight additive, which is commercially available from Elkem Materials Inc. A weight-reducing agent can reduce a density of the wellbore servicing fluid. Nonlimiting examples of suitable weight-reducing agents suitable for use in the present disclosure include hollow glass and ceramic beads.

The amount of the weighting agent or weight-reducing agent in the wellbore servicing fluid (e.g., cementitious fluid) may be an amount effective to produce a desired density of the wellbore servicing fluid. In embodiments, the weighting agent or the weight-reducing agent can be present in the wellbore servicing fluid in an amount of from about 1% BWOB to about 200% BWOB, alternatively from about 5% BWOB to about 150% BWOB, or alternatively from about 10% BWOB to about 100% BWOB, based on a total weight of the cement blend.

In embodiments, the wellbore servicing fluid (e.g., cementitious fluid) comprising a cement blend further comprises a foaming agent. In such embodiments, the wellbore servicing fluid comprising a cement blend forms a foamed cement having a density that is reduced in comparison to an otherwise similar composition prepared in the absence of the foaming agent. The foaming agent may be introduced (e.g., added into the wellbore servicing fluid) prior to placing the wellbore servicing fluid in the wellbore. The addition of a foaming agent to the cement composition may be accomplished by any suitable method. In embodiments, the foaming agent comprises a gas such as air, an inert gas such as nitrogen, and combinations thereof. The gas (e.g., nitrogen) may be introduced by direct injection into the wellbore servicing fluid. In such embodiments, the gas is present in the wellbore servicing fluid in an amount of from about 10 vol. % to about 30 vol. %, based on a total volume of the wellbore servicing fluid placed in the wellbore.

In embodiments, the foamed cement can have a density (e.g., a target density of the wellbore servicing fluid) of from about 5 ppg to about 16 ppg, alternatively from about 8 ppg to about 15 ppg, or alternatively from about 10 ppg to about 14 ppg.

In embodiments, the one or more additives (e.g., supplemental additives) can be present in the wellbore servicing fluid (e.g., cementitious fluid) in a total amount of from about 0.1 L/100 kg to about 50 L/100 kg, based on a total weight of the cement blend, alternatively from about 1 L/100 kg to about 35 L/100 kg, or alternatively from about 5 L/100 kg to about 20 L/100 kg, based on a total weight of the wellbore servicing fluid. Additives suitable for use in the present disclosure may be in solid form and in such embodiments the additive may be included in the wellbore servicing fluid in amounts of from about 0.05% BWOB to about 100% BWOB, alternatively from about 0.5% BWOB to about 50% BWOB, or alternatively from about 5% BWOB to about 20% BWOB, based on a total weight of the cement blend.

In embodiments, the wellbore servicing fluid (e.g., cementitious fluid) has a density of from about 9 pounds per gal Ion (ppg) to about 26 ppg, alternatively from about 11 ppg to about 22 ppg, or alternatively from about 13 ppg to about 18 ppg.

In embodiments, a wellbore servicing fluid (e.g., cementitious fluid) suitable for use in the present disclosure comprises about 20 wt. % of a cement blend based on the total weight of the wellbore servicing fluid and about 400 L/100 kg of water BWOB and has a density of about 9.6 ppg. In some other embodiments, a wellbore servicing fluid suitable for use in the present disclosure comprises about 40 wt. % of a cement blend based on the total weight of the wellbore servicing fluid and about 150 L/100 kg of water BWOB and has a density of about 11.5 ppg. In some other embodiments, a wellbore servicing fluid suitable for use in the present disclosure comprises about 60 wt. % of a cement blend based on the total weight of the wellbore servicing fluid and about 65 L/100 kg of water BWOB and has a density of about 14.1 ppg. In some other embodiments, a wellbore servicing fluid suitable for use in the present disclosure comprises about 70 wt. % of a cement blend based on the total weight of the wellbore servicing fluid and about 40 L/100 kg of water BWOB and has a density of about 16.0 ppg. In some other embodiments, a wellbore servicing fluid suitable for use in the present disclosure comprises about 75 wt. % of a cement blend based on the total weight of the wellbore servicing fluid and about 35 L/100 kg of water BWOB and has a density of about 17.1 ppg. In yet some other embodiments, a wellbore servicing fluid suitable for use in the present disclosure comprises about 90 wt. % of a cement blend based on the total weight of the wellbore servicing fluid and about 15 L/100 kg of water BWOB and has a density of about 21 ppg.

In embodiments, the wellbore servicing fluid (e.g., cementitious fluid) has a specific gravity of from about 0.5 to about 3, alternatively from about 1.1 to about 2.5, alternatively from about 1.3 to about 2.3, or alternatively from about 1.5 to about 2.0.

In embodiments, the wellbore servicing fluid (e.g., cementitious fluid) has a mixability rating of from about 3 to about 5, alternatively from about 4 to about 5. The mixability rating is on a 0 to 5 scale, where 0 is not mixable and 5 is fully mixable.

In embodiments, the wellbore servicing fluid (e.g., cementitious fluid) has a fluid loss of from about 10 ml per 30 minutes to about 250 ml per 30 minutes, alternatively from about 20 ml per 30 minutes to about 1.00 ml per 30 minutes, or alternatively from about 30 ml per 30 minutes to about 50 ml per 30 minutes, when measured on a 325 mesh screen at about 129° F. and 1,000 psig differential pressure in accordance with a test standard API-RP-10B-2.

In embodiments, the wellbore servicing fluid (e.g., cementitious fluid) has a 10-second static gel strength of from about 1 to about 50, alternatively from about 5 to about 40, or alternatively from about 10 to about 30, when measured at about 129° F. in accordance with the test standard API-RP-10B-2. In embodiments, the wellbore servicing fluid has a 10-minute static gel strength of from about 1 to about 300, alternatively from about 5 to about 150, or alternatively from about 10 to about 75, when measured at about 129° F. in accordance with the test standard API-RP-10B-2.

In embodiments, the wellbore servicing fluid (e.g., cementitious fluid) has a thickening time of from about 3 hours to about 24 hours, alternatively from about 4 hours to about 16 hours, or alternatively from about 5 hours to about 8 hours, when measured in accordance with the test standard API-RP-10B-2 to achieve about 70 Bearden units (Be) at about 129° F. and 5,000 psig.

In embodiments, the wellbore servicing fluid (e.g., cementitious fluid) has a 50 psi Ultrasonic Cement Analyzer (UCA) compressive strength of from about 1 hour to about 48 hours, alternatively from about 4 hours to about 24 hours, or alternatively from about 6 hours to about 18 hours, when measured at about 168° F. and 5,000 psig.

In embodiments, the wellbore servicing fluid (e.g., cementitious fluid) has a 500 psi UCA compressive strength of from about 2 hours to about 72 hours at, alternatively from about 6 hours to about 36 hours, or alternatively from about 8 hours to about 24 hours, when measured at about 168° F. and 5,000 psig in accordance with the test standard API-RP-10B-2.

In embodiments, the wellbore servicing fluid (e.g., cementitious fluid) has a 24 hr UCA compressive strength of from about 50 psig to about 10,000 psig, alternatively from about 250 psig to about 6,000 psig, or alternatively from about 500 psig to about 4,000 psig, when measured at about 168° F. and 5,000 psig in accordance with the test standard API-RP-10B-2.

In embodiments, the wellbore servicing fluid (e.g., cementitious fluid) has rheology readings in a range of from about 1 to about 350 at about 68° F., alternatively from about 2 to about 350 at about 129° F., or alternatively from about 2 to about 350 at about 190° F., when measured by a Fann® Model 35 viscometer at a speed of 3 rpm to 300 rpm in accordance with the test standard API-RP-10B-2.

In embodiments, after being cured at about 212° F. and 5,000 psig for about 7 days, the wellbore servicing fluid (e.g., cementitious fluid) forms a set cement having a crush compressive strength of from about 500 psig to about 12,000 psig, alternatively from about 1,500 psig to about 9,000 psig, or alternatively from about 3,000 psig to about 7,000 psig.

In embodiments, after being cured at about 212° F. and 5,000 psig for about 7 days, the wellbore servicing fluid (e.g., cementitious fluid) forms a set cement having a Young's Modulus of from about 0.3 Mpsig to about 3

Mpsig, alternatively from about 0.8 Mpsig to about 2 Mpsig, or alternatively from about 1.2 Mpsig to about 1.6 Mpsig.

In embodiments, after being cured at about 212° F. and 5,000 psig for about 7 days, the wellbore servicing fluid (e.g., cementitious fluid) forms a set cement having a Brazilian Tensile Strength of from about 50 psig to about 1,600 psig, alternatively from about 100 psig to about 900 psig, or alternatively from about 200 psig to about 700 psig.

A wellbore servicing fluid of the type disclosed herein can be prepared using any suitable method. In embodiments, a method of making the wellbore servicing fluid comprises contacting water with the liquid additive composition, cement blend, and optionally additives to form the wellbore servicing fluid.

In embodiments, the wellbore servicing fluid (e.g., cementitious fluid) can be prepared at the wellsite. Components of the wellbore servicing fluid can be transported to the wellsite and combined (e.g., mixed/blended) proximate the wellsite to form the wellbore servicing fluid. The components of the wellbore servicing fluid can be added into a container (e.g., a blender tub, for example mounted on a trailer), and the wellbore servicing fluid is then blended until the wellbore servicing fluid becomes a pumpable fluid.

The methods disclosed herein for preparing the wellbore servicing fluid (e.g., cementitious fluid) can comprise a continuous process (also referred to as an "on-the-fly" process). A continuous process or an "on-the-fly" process means one or more steps in the process are running on a continuous basis. For example, a contacting step can be continuous in which wellbore servicing fluid components are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process. The continuous process can be performed by using proper equipment (e.g., a mixer, a blender, feeders, pumps, etc.) and process management/control. For example, forming the liquid additive composition can be continuous using pumps and a blender; forming the cement blend can be continuous using a blender and solid feeders; conveying water, the liquid additive composition, and/or the one or more additives (e.g., supplemental additives) can be continuous using pumps; combining the cement blend with a mixture in the container can be continuous using a feeder; blending the cementitious fluid in the container can be continuous by generating a whirlpool continuously; and any combination thereof may be employed in a continuous process of the type described herein.

In embodiments, the liquid additive composition can be added at a controlled rate to the water or the wellbore servicing fluid (e.g., cementitious fluid) using a continuous mixing system (CMS) unit. The CMS unit can also be employed to control the rate at which water is introduced to the wellbore servicing fluid (e.g., cementitious fluid) as well as the rate at which any other optional additives are introduced to the wellbore servicing fluid or the water. As such, the CMS unit can be used to achieve an accurate and precise ratio of individual components in the wellbore servicing fluid, such that the properties of the wellbore servicing fluid are suitable for the downhole conditions of the wellbore. The concentrations of the components in the wellbore servicing fluid (e.g., cementitious fluid) can be adjusted to their desired amounts before delivering the composition into the wellbore. Those concentrations thus are not limited to the original design specification of the wellbore servicing fluid (e.g., cementitious fluid) composition and can be varied to account for changes in the downhole conditions of the wellbore that may occur before the composition is actually pumped into the wellbore.

After preparation, the liquid additive composition as disclosed herein can be added to a cement mixture to achieve post-set expansion. In some embodiments, for example in offshore operations, the liquid additive composition as disclosed herein can be added via a CMS to a water line going into a recirculating cement mixture (RCM). Mix water and cement (e.g., cement blend) may be combined in the RCM and then pumped downhole. In other embodiments, the liquid additive composition as disclosed herein can be batch mixed into the cement slurry (as opposed to adding the liquid additive composition via the CMS).

In embodiments, a cementitious fluid of the type disclosed herein can be prepared using any suitable method. In embodiments, a method of making the cementitious fluid comprises contacting water with the liquid additive composition and a cement blend prepared using the methods disclosed hereinabove at a location proximate a wellsite. The wellsite can comprise an offshore platform (e.g., an offshore oil and gas platform) and/or a floating vessel and the wellbore can be offshore. FIG. 1 depicts a process flow diagram of a method 200 of making a wellbore servicing fluid (e.g., cementitious fluid) of the type disclosed herein. Referring to FIG. 1, the water can be conveyed via a water flow line 201 from any resource, for example, seawater around the wellsite, produced water, and water conveyed from onshore. The method can comprise contacting a liquid additive composition of the type disclosed herein with water to form a mixture. Contacting the liquid additive composition with water can comprise conveying (e.g., via a liquid additive flow line 202) the liquid additive composition into the water in the water flow line 201. The combination of water and the liquid additive composition can be referred to as a diluted liquid additive composition or a first mixture. In embodiments, one or more additives (e.g., supplemental additives) of the type disclosed herein optionally can be added into the first mixture in a mixture flow line 205, for example by conveying the one or more supplemental additives (e.g., via one or more supplemental additive flow lines 204) into the first mixture in the mixture flow line 205 to form a second mixture. After contacting the liquid additive composition with water to form the first mixture, and optionally adding the one or more supplemental additives into the first mixture to form the second mixture, the first or second mixture can be further contacted with a cement blend prepared using the methods disclosed hereinabove. In embodiments, the first or second mixture is conveyed via the mixture flow line 205 to a container. The container can be any container that is compatible with the first or second mixture and the cement blend and has sufficient space. The cement blend can be added (e.g., metered by a solids feeding system such as a conveyor or auger) into the container and blended with the first or second mixture. The blending can be conducted using any suitable method/tool (e.g., a blender) until a pumpable fluid (e.g., the wellbore servicing fluid; cementitious fluid) is formed. In embodiments, the blending comprises generating whirlpools (e.g., vortexes) in the cementitious fluid. Whirlpools can be generated by any suitable method, for example by a nozzle that releases a jet of the contents of the container therein (e.g., a pump-around loop). In embodiments, prior to and/or concurrent with contacting the cement blend with the first or second mixture, the method further comprises adding a weighting agent or a weight-reducing agent to the cement blend, to the first mixture, to the second mixture, directly to the container, or any combination thereof. The weighting agent or the weight-reducing agent can be placed into the container having the other components of the wellbore servicing fluid therein.

The methods disclosed herein for preparing the cementitious fluid can comprise a continuous process (also referred to as an "on-the-fly" process). For example, a contacting step can be continuous in which the cement blend and the first or second mixture are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process of making the cementitious fluid. The continuous process of making the cementitious fluid can be performed by using proper equipment (e.g., a mixer, a blender, feeders, pumps, etc.) and process management/control. For example, forming the liquid additive composition can be continuous using pumps and a blender; forming the cement blend can be continuous using a blender and solid feeders; conveying water, the liquid additive composition, and/or the one or more supplemental additives can be continuous using pumps; combining the cement blend with the first or second mixture in the container can be continuous using a feeder; blending the wellbore servicing fluid in the container can be continuous by generating a whirlpool continuously; and any combination thereof may be employed in a continuous process of the type described herein.

Figure 2:
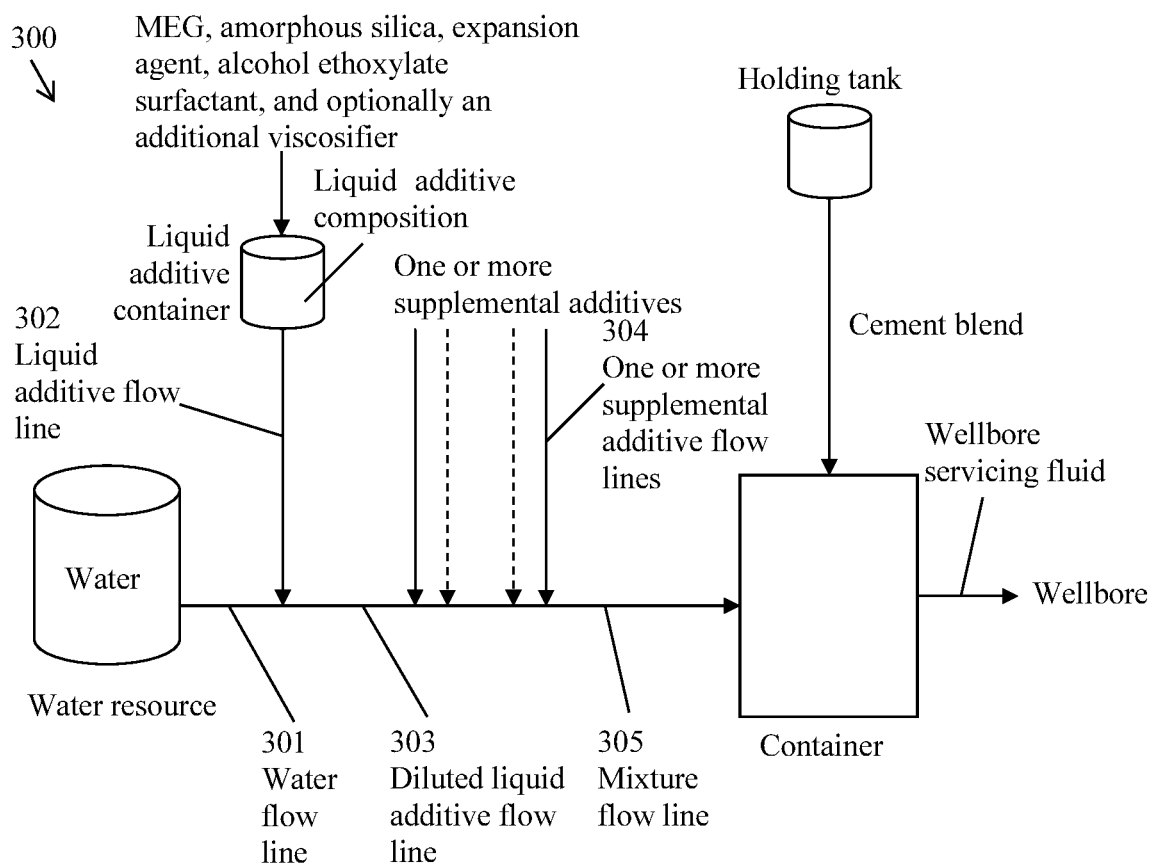
FIG. 2 is a process flow diagram according to some embodiments of the disclosure.

In embodiments, referring to FIG. 2, a method 300 disclosed herein comprises contacting a particulate material (e.g., an expansion agent, such as MgO), an organic carrier fluid (e.g., MEG), amorphous silica (e.g., precipitated silica), an alcohol alkoxylate surfactant (e.g., an alcohol ethoxylate surfactant), and optionally an additional viscosifier (e.g., diutan) of the types disclosed herein to form a liquid additive composition of the type disclosed herein. The contacting can be in a liquid additive container, and can occur proximate a wellsite or remote from a wellsite (e.g., prepared remotely and transported to a wellsite such as an offshore platform or a floating vessel). The method can take place at a location proximate an offshore platform and/or a floating vessel, where a water flow line 301 conveys water from a water resource (e.g., seawater around the offshore platform or the floating vessel). The method can further comprise conveying the liquid additive composition via a liquid additive flow line 302 into the water in the water flow line 301 to form a diluted liquid additive. In embodiments, the method further comprises conveying one or more additives (e.g., supplemental additives) via one or more supplemental additive flow lines 304 into the diluted liquid additive in a diluted liquid additive flow line 303 to form a mixture in a mixture flow line 305. One or more pumps can be used on each of the water flow line 301, the liquid additive flow line 302, the diluted liquid additive flow line 303, the one or more supplemental additive flow lines 304, and the mixture flow line 305. In embodiments, the method further comprises placing the mixture in a container (e.g., a mixing container). A cement blend of the type disclosed herein from a cement blend resource (e.g., a holding tank) can be added into the mixture to form a slurry within the container. A solid feeding system (e.g., a solid feeder such as an auger feeder or a screw feeder) can be used for adding the cement blend into the container. The method can further comprise blending the slurry to form a pumpable fluid (e.g., the cementitious fluid). The blending can be by a blender. In embodiments, the blending is by generating whirlpools in the slurry within the container (e.g., by a nozzle in the container that releases a jet of the slurry). The wellbore servicing fluid can then be placed downhole.

In embodiments, a wellbore servicing fluid of the type disclosed herein is used as a cementitious fluid, for example comprising a cement blend of the type disclosed herein. The method of the present disclosure can further comprise placing the wellbore servicing fluid in an offshore wellbore penetrating a subterranean formation and allowing at least a portion of ti e wellbore servicing fluid to set. The wellbore servicing fluid can be used to permanently seal the annular space between the conduit (e.g., casing) and the wellbore wall or the annular space between two casings. The wellbore servicing fluid can also be used to seal formations to prevent loss of drilling fluid (e.g., in squeeze cementing operations) and for operations ranging from setting kick-off plugs to plug and abandonment of a wellbore.

In embodiments, a wellbore servicing fluid (e.g., cementitious fluid) of the type disclosed herein can be employed in well completion operations such as primary and secondary cementing operations. The cementitious fluid may be placed into an annulus of the wellbore (e.g., an annulus formed between casing and a wellbore wall) and allowed to set such that it isolates the subterranean formation from a different portion of the wellbore. The cementitious fluid thus forms a barrier that prevents fluids in that subterranean formation from migrating into other subterranean formations. Within the annulus, the cementitious fluid also serves to support a conduit, e.g., casing, in the wellbore. In embodiments, the wellbore in which the cementitious fluid is positioned belongs to a multilateral wellbore configuration. It is to be understood that a multilateral wellbore configuration includes at least two principal wellbores connected by one or more ancillary wellbores.

In secondary cementing, often referred to as squeeze cementing, the wellbore servicing fluid (e.g., cementitious fluid) can be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, to plug a permeable zone, and so forth.

Figure 3:
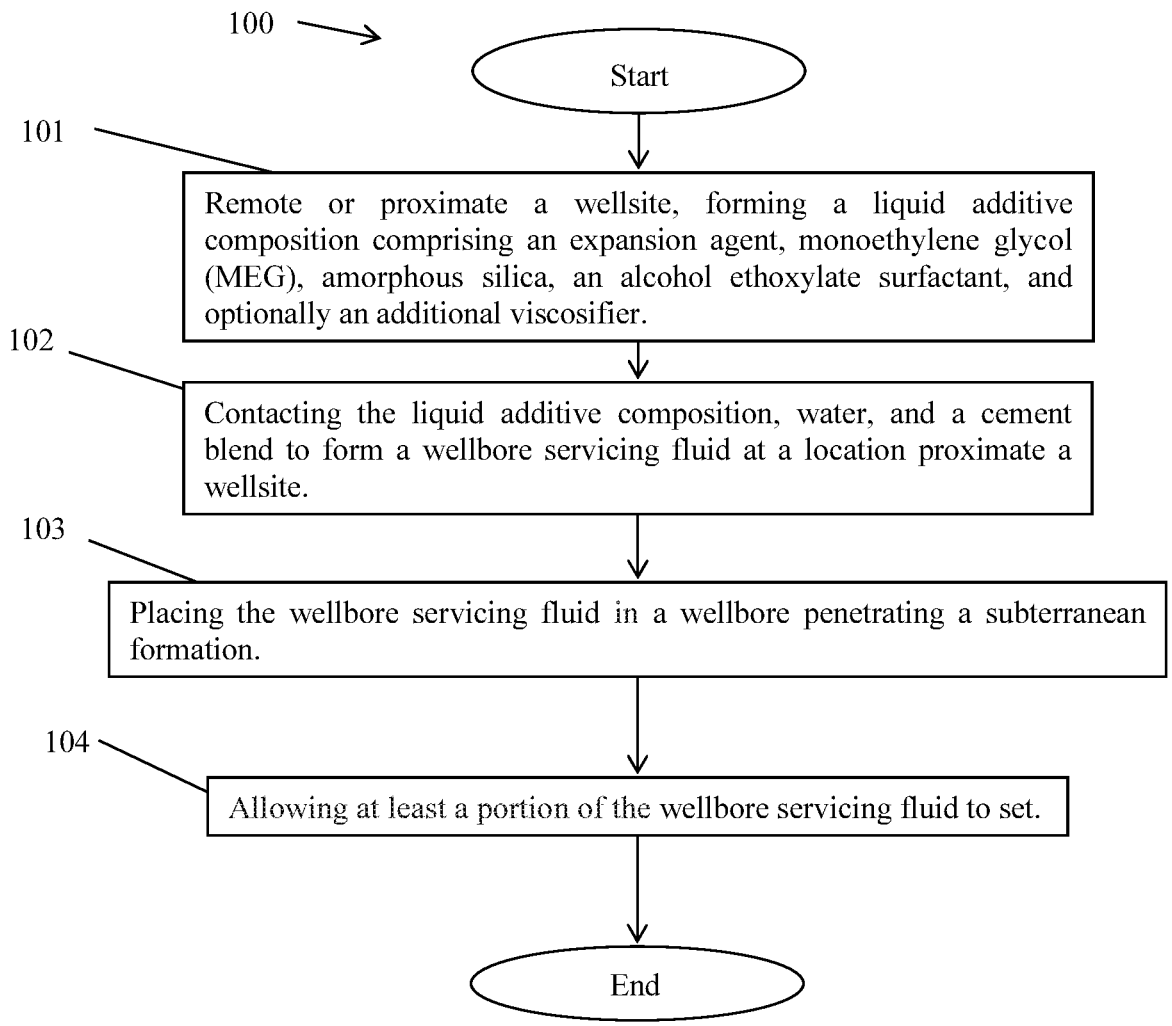
FIG. 3 is a flow chart of a method according to some embodiments of the disclosure.

FIG. 3 illustrates a method 100 in accordance with the present disclosure. Block 101 includes forming a liquid additive composition of the type disclosed herein, either at (e.g., proximate) a wellsite or remote from the wellsite and transported to the wellsite. The forming can comprise contacting a particulate material (e.g., an expansion agent, such as MgO), an organic carrier (e.g., MEG), amorphous silica (e.g., precipitated silica), an alcohol alkoxylate surfactant (e.g., alcohol ethoxylate surfactant), and optionally an additional viscosifier (e.g., diutan). Block 102 includes contacting the liquid additive composition, water, and a cement blend of the type disclosed herein to form a wellbore servicing fluid (e.g., cementitious fluid) at a location proximate a wellsite. The wellsite can be an offshore oil and gas platform and/or a floating vessel. Block 103 includes placing the wellbore servicing fluid in a wellbore penetrating a subterranean formation, for example as a primary or secondary cementing operation. The wellbore can be an offshore wellbore. Block 104 includes allowing at least a portion of the wellbore servicing fluid (e.g., cementitious fluid) to set. At least a portion of block 101, block 102, and block 103 can comprise a continuous process as disclosed herein.

Figure 4:
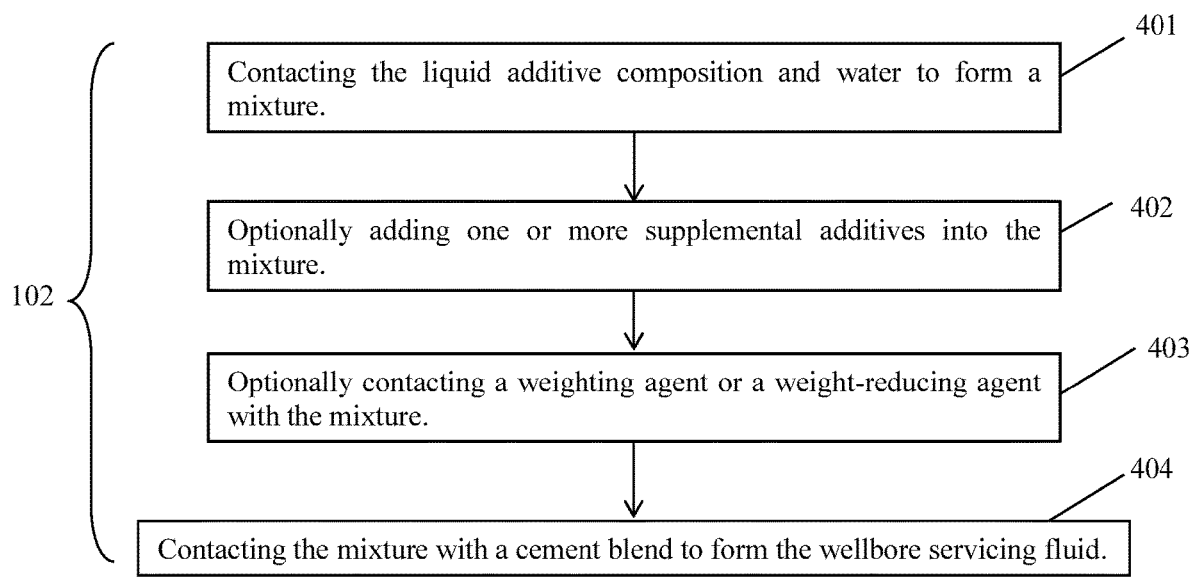
FIG. 4 is a flow chart of a method according to some embodiments of the disclosure.

Referring to FIG. 4, in embodiments, block 102 further comprises block 401, block 402, block 403, and block 404. Block 401 includes contacting the liquid additive composition and water to form a mixture. Block 402 is optional and includes adding one or more additives (e.g., supplemental additives) of the type disclosed herein into the mixture. Block 403 is optional and includes contacting a weighting agent or a weight-reducing agent with the mixture. Block 404 includes contacting the mixture with the cement blend to form a wellbore servicing fluid (e.g., cementitious fluid).

Figure 5:
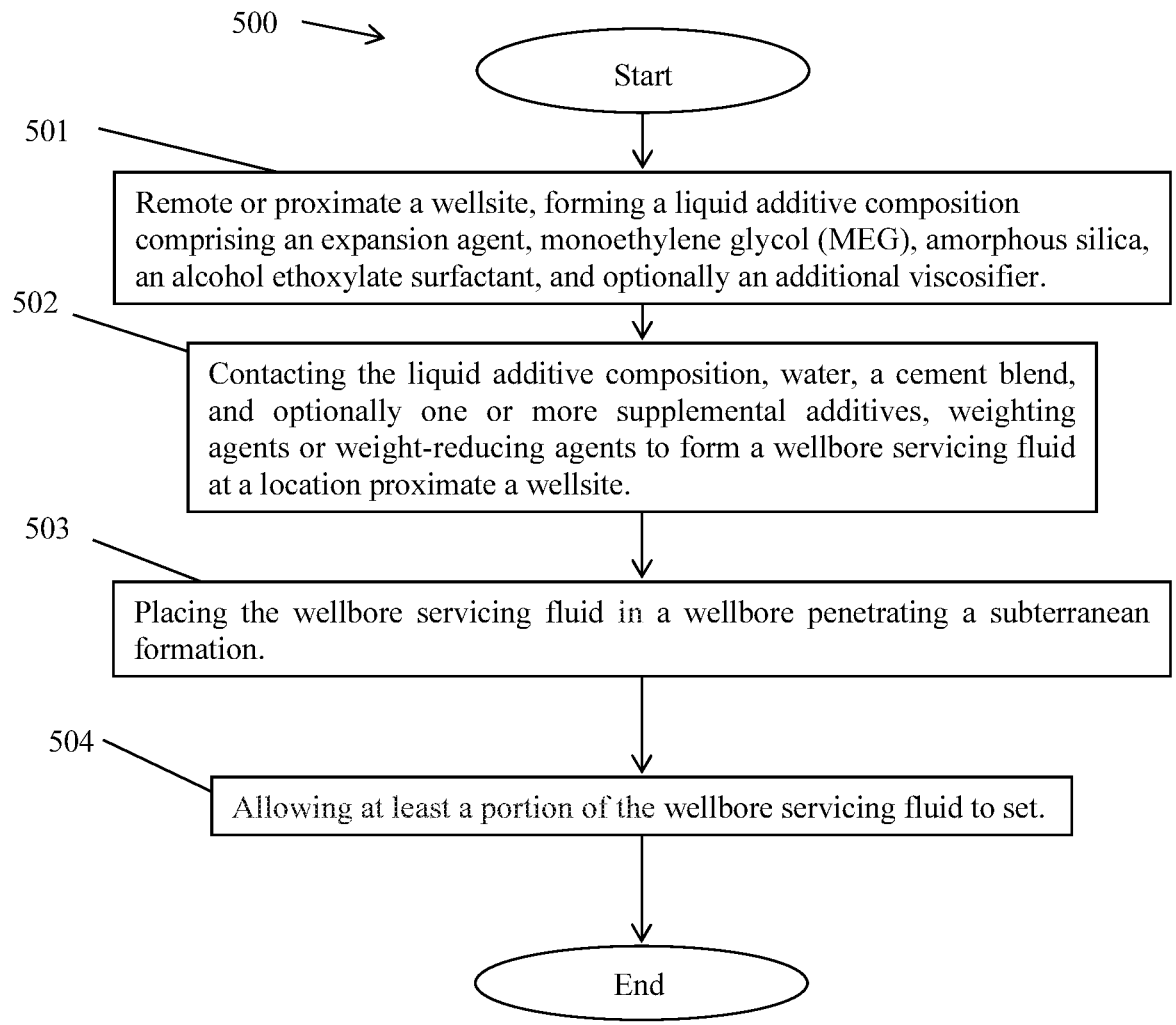
FIG. 5 is a flow chart of a method according to some embodiments of the disclosure.

FIG. 5 illustrates a method 500 in accordance with the present disclosure. Block 501 includes forming a liquid additive composition of the type disclosed herein, either at (e.g., proximate) a wellsite or remote from the wellsite and transported to the wellsite. The forming can comprise contacting a particulate material (e.g., an expansion agent, such as MgO), an organic carrier (e.g., MEG), amorphous silica (e.g., precipitated silica), an alcohol alkoxylate surfactant (e.g., alcohol ethoxylate surfactant), and optionally an additional viscosifier (e.g., diutan). Block 502 includes contacting the liquid additive composition, water, a cement blend of the type disclosed herein (e.g., a dry cement blend comprising a cementitious material and optionally one or more dry additives), and optionally one or more additives (e.g., supplemental additives) and/or weighting agents or weight-reducing agents, to form a wellbore servicing fluid (e.g., cementitious fluid) at a location proximate a wellsite. The wellsite can be an offshore oil and gas platform and/or a floating vessel. Block 503 includes placing the wellbore servicing fluid in a wellbore penetrating a subterranean formation, for example as a primary or secondary cementing operation. The wellbore can be an offshore wellbore. Block 504 includes allowing at least a portion of the wellbore servicing fluid to set. At least a portion of block 501, block 502, and block 503 can comprise a continuous process as disclosed herein.

Various benefits may be realized by utilization of the presently disclosed methods and compositions. For example, the wellbore servicing compositions (e.g., cementitious fluid) of the present disclosure may exclude a biocide resulting in a reduced risk to organisms in surrounding environment. In addition, an advantage of the present disclosure is that the liquid additive composition used in the disclosed compositions and methods is easier to handle and allows improved accuracy with regard to metering an amount to add to a system, compared with a dry powder expansion agent. For example, some fluid preparation systems that cannot process a dry powder expansion agent due to limited equipment/tools (e.g., equipment/tools at an offshore platform) can process the liquid additive composition. Also, the liquid additive composition can be stable for more than 7 days which allows a sufficient time for transportation and storage.

As disclosed herein, a pumpable liquid containing an expansion agent (e.g., MgO) may advantageously allow for using the liquid additive composition in offshore cementing operations without adding the expansion agent to the cement dry powder blend. The liquid additive composition can be transported to the offshore rig as a liquid, stored in a chemical room and used on an as needed basis. This advantageously eliminates unnecessary additions to the dry cement powder blend, thereby reducing material costs and increasing asset value.

The liquid additive composition as disclosed herein (e.g., MgO in MEG suspension) may advantageously allow for pumping particulate material (e.g., expansion agent, such as MgO) as a liquid. When the liquid additive composition comprises MgO, the liquid additive composition may advantageously prevent MgO hydration to Mg(OH)$_2$ prior to use. The liquid additive composition as disclosed herein may advantageously contain more than 40 wt. % MgO, which is enabled through the use of amorphous silica (e.g., precipitated silica) and diutan gum (which are added to the composition for rheological control and product stability). The surfactant such as an alcohol alkoxylate surfactant (e.g., alcohol ethoxylate surfactant) is added to composition to maintain free flow of the liquid additive composition and avoid gelation. Conventional ways of introducing an expansion agent to a cementitious fluid are not highly effective for materials as dense as MgO and require a relatively higher level of rheological control. The liquid additive composition as disclosed herein overcomes the limitations of conventional methods which suffer from gelation/separation concerns.

Inclusion of surfactant such as an alcohol alkoxylate surfactant (e.g., alcohol ethoxylate surfactant) with an organic carrier fluid such as MEG may advantageously prevent the development of strong gels, maintain product fluidity, reduce fluid separation, and mitigate hard packing of the solids during storage. Conventional suspensions that comprise an expansion agent and MEG, but no surfactant such as an alcohol alkoxylate surfactant (e.g., alcohol ethoxylate surfactant) exhibit either high viscosity or product instability. Conventional suspensions that comprise an expansion agent and an oil based carrier fluid result in undesirable gelation when added to a cement slurry.

The liquid additive composition as disclosed herein advantageously contains a surfactant such as an alcohol alkoxylate surfactant (e.g., alcohol ethoxylate surfactant). When the surfactant (e.g., an alcohol alkoxylate surfactant) is not included in the liquid additive composition, the suspension of particulate material in organic carrier fluid may suffer from gelation, and thus its ability to free flow is reduced. Consequently, wellbore servicing operations may be significantly complicated, and/or the suspension of particulate material in organic carrier fluid may be rendered unusable in the absence of the surfactant (e.g., an alcohol alkoxylate surfactant). Combination of the surfactant (e.g., an alcohol ethoxylate surfactant) with an ethylene oxide-based carrier fluid (e.g., an organic carried fluid as disclosed herein, such as MEG) may advantageously prevent gelation when the liquid additive composition is added to a cement slurry. The concentration of diutan alone or in combination with amorphous silica (e.g., precipitated silica) in the liquid additive composition may advantageously control rheological parameters such as yield point and plastic viscosity. In an aspect, the liquid additive composition as disclosed herein advantageously prevents the particulate material (e.g., MgO) from hydrating or reducing the hydration rate (e.g., restricts or retards hydration) of the particulate material (e.g., MgO). In an aspect, the liquid additive composition as disclosed herein advantageously provides an improved shelf-life for the liquid additive composition. For example, the liquid additive provides a stable suspension of the particulate material (e.g., a shelf-life stability) of equal to or greater than 1, 3, 6, 9, or 12 months from the date of mixing of the components to form the liquid additive composition.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Different formulations for a liquid additive composition of the type disclosed herein is shown in Table 1 below. Liquid additive compositions (samples I, II and III) and a comparison composition (sample IV) were prepared and tested as follows.

TABLE 1

| | Sample I | Sample II | Sample III | Sample IV |
|---|---|---|---|---|
| Material | | | | |
| Ethylene Glycol, g | 381.31 | 381.31 | 507.96 | 381.31 |
| Precipitated Silica, g | 18.42 | 18.42 | 36.45 | 18.42 |
| Magnesium Oxide, g | 331.58 | 331.58 | 441.72 | 331.58 |
| Diutan Gum, g | 0.00 | 0.10 | 0.13 | 0.10 |
| Alcohol Ethoxylate Surfactant, g | 5.53 | 5.53 | 14.73 | 0.00 |
| Properties | | | | |
| Initial Plastic Viscosity, cP | 820 | 1286 | 340 | 1682 |
| Initial Yield Point, lb/100 ft$^2$ | 7.4 | 13.3 | 5.3 | 16.5 |
| Aged Plastic Viscosity, cP | 853 | 1056 | 409 | 1789 |
| Aged Yield Point, lb/100 ft$^2$ | 1.0 | 10.7 | 3.2 | 11.8 |
| Observations | Low free fluid, good fluidity, and thin layer of soft sediment on bottom of container after 1 week | Low free fluid and good fluidity after 11 days | No visual free fluid, good fluidity and no significant sedimentation | Low free fluid, mild gel, free flow after homogenizing, soft sediment layer |

The suspensions in Table 1 were prepared by adding ethylene glycol to a mixing vessel and applying shear. The precipitated silica was then blended into the ethylene glycol followed by addition of MgO powder. Diutan gum, for samples II, III, and IV, was then added and shear was applied to partially yield the polymer. Lastly, the alcohol ethoxylate surfactant, for samples I, II, and III, was added to the suspensions.

Figure 6:
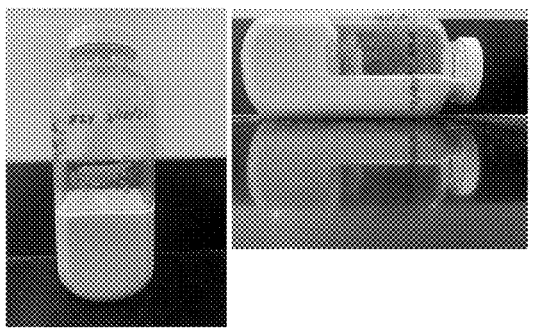
FIG. 6 displays photos of liquid additive composition samples from Example 1.
Figure 6:
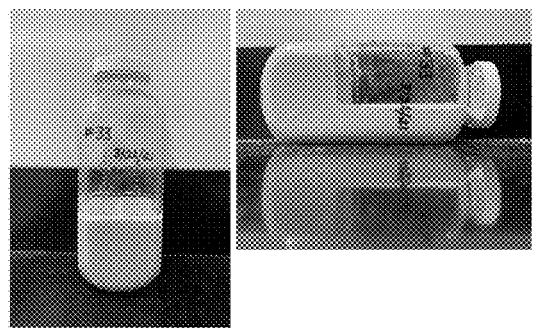
Figure 6:
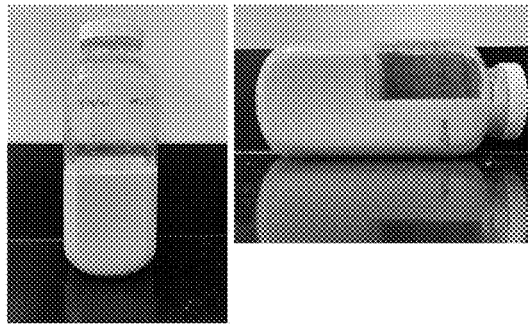
Figure 6:
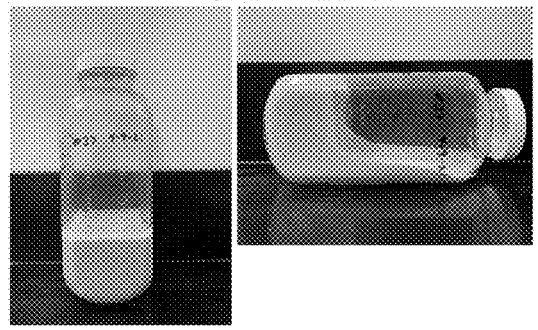

Samples I, II, III and IV were tested for plastic viscosity and yield point at the time of preparation (initial properties), as well as several days after preparation (aged properties), and the resulting data is displayed in Table 1. FIG. 6 and Table 1 show the suspension stability in terms of free fluid for all three samples. Sample I exhibits low free fluid and good fluidity, but the aged yield point may pose a risk to maintaining solids suspension for extended periods of time. Sample IV exhibits higher free fluid than Samples I, II and III and has reduced fluidity compared to Samples I, II, and III, but the yield point is such that solid sedimentation over time is low. Samples II and III have both good yield point and good fluidity after aging, indicating low risk for sedimentation and gelation over time.

Additional Disclosure

A first embodiment which is a liquid additive composition comprising a particulate material, an organic carrier fluid, a viscosifier, and a surfactant; wherein the particulate material is substantially insoluble in the organic carrier fluid; wherein the particulate material comprises a water-interactive material and/or a water-insoluble material; and wherein the organic carrier fluid comprises a glycol and/or a glycol ether.

A second embodiment which is the liquid additive composition of the first embodiment, wherein the viscosifier further comprises a biopolymer gum, guar gum, xanthan gum, welan gum, diutan, cellulose, hydroxyethyl cellulose (HEC), modified cellulose, diatomaceous earth, starch, modified and/or crosslinked starch, viscoelastic surfactants (VES), derivatives thereof, or combinations thereof.

A third embodiment which is the liquid additive composition of the first or second embodiment, wherein the viscosifier comprises diutan.

A fourth embodiment which is the liquid additive composition of the third embodiment, wherein the viscosifier further comprises amorphous silica.

A fifth embodiment which is the liquid additive composition of the fourth embodiment, wherein the amorphous silica comprises non-mined amorphous silica, precipitated silica, fumed silica, silica fume, porous silica, micro-sized silica, nano-sized silica, or combinations thereof.

A sixth embodiment which is the liquid additive composition of any of the first through fifth embodiments, wherein the viscosifier is present in the liquid additive composition in an amount of from about 0.01 wt. % to about 10 wt. %, based on a total weight of the liquid additive composition.

A seventh embodiment which is the liquid additive composition of any of the first through sixth embodiments, wherein the surfactant comprises an alcohol alkoxylate surfactant.

An eighth embodiment which is the liquid additive composition of the seventh embodiment, wherein surfactant the is characterized by the general formula $R^1(OR^2)_nOH$; wherein n is from about 1 to about 30; wherein $R^1$ is an alkyl group having from about 3 to about 25 carbon atoms; wherein $R^1$ is characterized by a degree of branching of from 0 to about 5; and wherein $R^2$ is an alkylene group having from about 2 to about 5 carbon atoms.

A ninth embodiment which is the liquid additive composition of the eighth embodiment, wherein $R^2$ is ethylene and/or propylene.

A tenth embodiment which is the liquid additive composition of any of the first through ninth embodiments, wherein the surfactant is present in the liquid additive composition in an amount of from about 0.1 wt. % to about 10 wt. %, based on a total weight of the liquid additive composition.

A eleventh embodiment which is the liquid additive composition of any of the first through tenth embodiments, wherein the water-interactive material comprises an expansion agent, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, metal powders, aluminum powder, magnesium powder, iron powder, zinc powder, a gypsum blend, inorganic silicates, magnesium iron silicate, olivine; an ettringite precursor, ettringite, calcium aluminum sulfate, hydrous calcium aluminum sulfate, a calcium aluminate mixture, a calcium aluminate cement (CAC) and calcium sulfate mixture, a gypsum blend, a calcium aluminate/calcium sulfate blend; a viscosifying clay, bentonite, sepiolite, hectorite; a delayed viscosifier, crosslinked guar, crosslinked vinyl alcohols, crosslinked acrylamide polymers; a fluid loss agent, an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethyl-acrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N—N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof; or combinations thereof.

A twelfth embodiment which is the liquid additive composition of any of the first through eleventh embodiments, wherein the water-insoluble material comprises pozzolana cement; sand; a weighting agent, an iron oxide, hematite, a manganese oxide, hausmannite, a titanium-iron oxide, ilmenite; a fiber, a carbon fiber, an acrylonitrile fiber, a polypropylene fiber, a glass fiber, a rubber fiber; a rubber particle; a hollow glass sphere; a hollow pozzolanic sphere; a glass bubble; a glass ball; a ceramic ball; graphite; pozzolan; pumice; trass; clay; calcined clay; or combinations thereof.

A thirteenth embodiment which is the liquid additive composition of any of the first through twelfth embodiments, wherein the particulate material is characterized by a particle size of from about 10 nm to about 1,000 μm.

A fourteenth embodiment which is the liquid additive composition of any of the first through thirteenth embodiments, wherein the particulate material is characterized by a shape selected from the group consisting of cylindrical, discoidal, spherical, tabular, ellipsoidal, equant, irregular, cubic, acicular, angular, and combinations thereof.

A fifteenth embodiment which is the liquid additive composition of any of the first through fourteenth embodiments, wherein the particulate material is present in the liquid additive composition in an amount of from about 10 wt. % to about 80 wt. %, based on a total weight of the liquid additive composition.

A sixteenth embodiment which is the liquid additive composition of any of the first through fifteenth embodiments, wherein the glycol comprises an alkylene glycol, monoethylene glycol, propylene glycol, butylene glycol, polyalkylene glycol, polyethylene glycol, polypropylene glycol, polybutylene glycol, or combinations thereof and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or combinations thereof.

A seventeenth embodiment which is the liquid additive composition of any of the first through sixteenth embodiments, wherein the organic carrier fluid is present in the liquid additive composition in an amount of from about 20 wt. % to about 90 wt. %, based on a total weight of the liquid additive composition.

An eighteenth embodiment which is the liquid additive composition of the first embodiment, wherein the particulate material comprises magnesium oxide, non-calcined magnesium oxide, calcined magnesium oxide, lightly burned magnesium oxide, hard burned magnesium oxide, dead burned magnesium oxide, or combinations thereof wherein the viscosifier comprises amorphous silica and diutan; wherein the organic carrier fluid comprises monoethylene glycol; wherein the surfactant is an alcohol ethoxylate surfactant characterized by the general formula $R^1(OCH_2CH_2)_nOH$, wherein n is about 5, wherein $R^1$ is an alkyl group having about 10 carbon atoms, and wherein $R^1$ is characterized by a degree of branching of about 1.

A nineteenth embodiment which is the liquid additive composition of the eighteenth embodiment having (i) from about 40 wt. % to about 75 wt. % particulate material, (ii) from about 25 wt. % to about 60 wt. % ethylene glycol, (iii) from about 0.25 wt. % to about 5 wt. % amorphous silica, (iv) from equal to or greater than about 0 wt. % to about 0.1 wt. % diutan, and (v) from about 0.25 wt. % to about 4 wt. % alcohol ethoxylate surfactant; based on a total weight of the liquid additive composition.

A twentieth embodiment which is the liquid additive composition of any of the first through nineteenth embodiments, wherein the liquid additive composition has (A1) an initial plastic viscosity and/or aged plastic viscosity of from about 200 cP to about 2,500 cP; and/or (A2) an initial yield point and/or aged yield point of from about 1 $lb_f/100$ $ft^2$ to about 30 $lb_f/100$ $ft^2$; wherein the initial plastic viscosity and the aged plastic viscosity are measured under the same conditions at the time of preparing the composition and at a time later than the time of preparing the composition, respectively; and wherein the initial yield point and the aged yield point are measured under the same conditions at the time of preparing the composition and at a time later than the time of preparing the composition, respectively.

A twenty-first embodiment which is the liquid additive composition of the twentieth embodiment, wherein the initial plastic viscosity and the aged plastic viscosity are calculated using a Herschel-Bulkley model; and wherein the initial yield point and the aged yield point are calculated using a Herschel-Bulkley model.

A twenty-second embodiment which is a wellbore servicing fluid comprising the liquid additive composition of any of the first through twenty-first embodiments, water, a cement blend, and optionally one or more supplemental additives, weighting agents or weight-reducing agents.

A twenty-third embodiment with is the wellbore servicing fluid of the twenty-second embodiment, wherein the liquid additive composition is present in the wellbore servicing fluid in an amount of from about 0.1 wt. % to about 60 wt. %, based on a total weight of the wellbore servicing fluid.

A twenty-fourth embodiment which is the wellbore servicing fluid of the twenty-second or twenty-third embodiments, wherein the cement blend is present in the wellbore servicing fluid in an amount ranging from about 20 wt. % to about 90 wt. %, based on a total weight of the wellbore servicing fluid.

A twenty-fifth embodiment which is a method comprising: (a) contacting at a location proximate a wellsite the liquid additive composition of any of the first through twenty-first embodiments, water, a cement blend, and optionally one or more supplemental additives to form a wellbore servicing fluid; and (b) placing the wellbore servicing fluid in a wellbore penetrating a subterranean formation.

A twenty-sixth embodiment which is the method of the twenty-fifth embodiment, wherein the wellbore servicing fluid is a pumpable cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set in the wellbore.

A twenty-seventh embodiment which is a method comprising: (a) contacting a particulate material, an organic carrier fluid, a viscosifier, and an alcohol alkoxylate surfactant to form a mixture; and (b) agitating the mixture to form the liquid additive composition of any of the first through twenty-first embodiments.

A twenty-eighth embodiment which is the method of the twenty-seventh embodiment, wherein agitating comprises shearing, stirring, shaking, blending, mixing, gas bubbling, pumping, or combinations thereof.

A twenty-ninth embodiment which is the method of any of the twenty-seventh or twenty-eighth embodiment further comprising contacting the liquid additive composition with water, a cement blend and optionally one or more supplemental additives, weighting agents or weight-reducing agents to form the wellbore servicing fluid of any of the twenty-second through the twenty-fourth embodiments.

A thirtieth embodiment which is a method comprising: (a) contacting the liquid additive composition of any of first through twenty-first embodiments, water, cement blend, and optionally one or more supplemental additives to form the wellbore servicing fluid of any of twenty-second through the twenty-fourth embodiments at a location proximate a wellsite; and (b) placing the wellbore servicing fluid in a wellbore penetrating a subterranean formation.

A thirty-first embodiment which is the method of the thirtieth embodiment, further comprising transporting the liquid additive composition of any of first through twenty-first embodiments, water, cement blend, and optionally one or more supplemental additives to the location proximate a wellsite.

A thirty-second embodiment which is the method of the thirtieth-first embodiment, wherein the liquid additive composition of any of first through twenty-first embodiments is combined with one or more dry components, for example without limitation a dry cement blend, one or more dry supplemental additives, or any combination thereof at the location proximate a wellsite (e.g., an offshore platform). The dry cement blend and/or the dry supplemental additives may be in the form of a dry powder or dry granular material, and the dry components can be mixed with the liquid additive and water to form the wellbore servicing fluid as described herein.

A thirty-third embodiment which is the method of any of the thirtieth through thirty-second embodiments, wherein the wellsite comprises an offshore platform, a floating vessel, or combinations thereof; and wherein the wellbore is offshore.

A thirty-fourth embodiment which is the method of any of the thirtieth through thirty-third embodiments, wherein the wellbore servicing fluid is a cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set. In an aspect, said method of the thirty-fourth embodiment is performed on an offshore platform.

A thirty-fifth embodiment which is the method of the thirty-fourth embodiment, further comprising adding a weighting agent or a weight-reducing agent to the wellbore servicing fluid prior to placing the wellbore servicing fluid in the wellbore; wherein the weighting agent or the weight-reducing agent is added to the mixture prior to or concurrent with contacting the mixture with the cement blend.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A liquid additive composition comprising a particulate material, an organic carrier fluid, a viscosifier, and a surfactant; wherein the particulate material is substantially insoluble in the organic carrier fluid; wherein the particulate material comprises a water-interactive material and/or a water-insoluble material; and wherein the organic carrier fluid comprises a glycol and/or a glycol ether;
wherein the surfactant is characterized by the general formula $R^1(OR^2)_nOH$, where n is from about 1 to about 30, where $R^1$ is an alkyl group having from about 3 to about 25 carbon atoms, where $R^1$ is characterized by a degree of branching of from 0 to about 5, and where $R^2$ is an alkylene group having from about 2 to about 5 carbon atoms.

2. The liquid additive composition of claim 1, wherein the viscosifier comprises a biopolymer gum, guar gum, xanthan gum, welan gum, diutan, cellulose, hydroxyethyl cellulose (HEC), modified cellulose, diatomaceous earth, starch, modified and/or crosslinked starch, viscoelastic surfactants (VES), derivatives thereof, or combinations thereof.

3. The liquid additive composition of claim 1 wherein the viscosifier comprises amorphous silica.

4. The liquid additive composition of claim 3 wherein the viscosifier further comprises diutan.

5. The liquid additive composition of claim 3, wherein the amorphous silica comprises non-mined amorphous silica, precipitated silica, fumed silica, silica fume, porous silica, micro-sized silica, nano-sized silica, or combinations thereof.

6. The liquid additive composition of claim 1, wherein the viscosifier is present in the liquid additive composition in an amount of from about 0.01 wt. % to about 10 wt. %, based on a total weight of the liquid additive composition.

7. The liquid additive composition of claim 6, wherein the surfactant is present in the liquid additive composition in an amount of from about 0.1 wt. % to about 10 wt. %, based on a total weight of the liquid additive composition.

8. The liquid additive composition of claim 7, wherein the particulate material is present in the liquid additive composition in an amount of from about 10 wt. % to about 80 wt. %, based on a total weight of the liquid additive composition.

9. The liquid additive composition of claim 8, wherein the organic carrier fluid is present in the liquid additive composition in an amount of from about 20 wt. % to about 90 wt. %, based on a total weight of the liquid additive composition.

10. The liquid additive composition of claim 1, wherein $R^2$ is ethylene and/or propylene.

11. The liquid additive composition of claim 1, wherein the water-interactive material comprises an expansion agent, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, metal powders, aluminum powder, magnesium powder, iron powder, zinc powder, a gypsum blend, inorganic silicates, magnesium iron silicate, olivine; an ettringite precursor, ettringite, calcium aluminum sulfate, hydrous calcium aluminum sulfate, a calcium aluminate mixture, a calcium aluminate cement (CAC) and calcium sulfate mixture, a gypsum blend, a calcium aluminate/calcium sulfate blend; a viscosifying clay, bentonite, sepiolite, hectorite; a delayed viscosifier, crosslinked guar, crosslinked vinyl alcohols, crosslinked acrylamide polymers; a fluid loss agent, an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethyl-acrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N—N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof; or combinations thereof.

12. The liquid additive composition of claim 1, wherein the water-insoluble material comprises pozzolana cement; sand; a weighting agent, an iron oxide, hematite, a manganese oxide, hausmannite, a titanium-iron oxide, ilmenite; a fiber, a carbon fiber, an acrylonitrile fiber, a polypropylene fiber, a glass fiber, a rubber fiber; a rubber particle; a hollow glass sphere; a hollow pozzolanic sphere; a glass bubble; a glass ball; a ceramic ball; graphite; pozzolan; pumice; trass; clay; calcined clay; or combinations thereof.

13. The liquid additive composition of claim 1, wherein the glycol comprises an alkylene glycol, monoethylene glycol, propylene glycol, butylene glycol, polyalkylene glycol, polyethylene glycol, polypropylene glycol, polybutylene glycol, or combinations thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or combinations thereof.

14. A liquid additive composition comprising a particulate material, an organic carrier fluid, a viscosifier, and a surfactant;
wherein the particulate material is substantially insoluble in the organic carrier fluid and wherein the particulate material comprises a water-interactive material and/or a water-insoluble material;
wherein the organic carrier fluid comprises a glycol and/or a glycol ether;
wherein the particulate material comprises magnesium oxide, non-calcined magnesium oxide, calcined magnesium oxide, lightly burned magnesium oxide, hard burned magnesium oxide, dead burned magnesium oxide, or combinations thereof;
wherein the viscosifier comprises amorphous silica and diutan;
wherein the organic carrier fluid comprises monoethylene glycol; and
wherein the surfactant is an alcohol ethoxylate surfactant characterized by the general formula $R^1(OCH_2CH_2)_nOH$, where n is about 5, where $R^1$ is an alkyl group having about 10 carbon atoms, and where $R^1$ is characterized by a degree of branching of about 1.

15. The liquid additive composition of claim 14 having (i) from about 10 wt. % to about 80 wt. % particulate material, (ii) from about 25 wt. % to about 60 wt. % ethylene glycol, (iii) from about 0.25 wt. % to about 5 wt. % amorphous silica, (iv) from equal to or greater than about 0 wt. % to about 0.1 wt. % diutan, and (v) from about 0.25 wt. % to about 4 wt. % alcohol ethoxylate surfactant; based on a total weight of the liquid additive composition.

16. A wellbore servicing fluid comprising the liquid additive composition of claim 1, water, a cement blend, and optionally one or more supplemental additives.

17. A method comprising:
(a) contacting at a location proximate a wellsite the liquid additive composition of claim 1, water, a cement blend, and optionally one or more supplemental additives to form a wellbore servicing fluid; and
(b) placing the wellbore servicing fluid in a wellbore penetrating a subterranean formation.

18. The method of claim 17, wherein the wellbore servicing fluid is a pumpable cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set in the wellbore.

19. A method comprising:
(a) contacting at a location proximate a wellsite the liquid additive composition of claim 14, water, a cement blend, and optionally one or more supplemental additives to form a wellbore servicing fluid; and
(b) placing the wellbore servicing fluid in a wellbore penetrating a subterranean formation.

20. The method of claim 19, wherein the wellbore servicing fluid is a pumpable cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set in the wellbore.

* * * * *